(12) United States Patent
Chu et al.

(10) Patent No.: US 11,313,401 B2
(45) Date of Patent: Apr. 26, 2022

(54) BOLT

(71) Applicant: CHUN YU WORKS & CO., LTD., Kaohsiung (TW)

(72) Inventors: Yu-Ren Chu, Taipei (TW); Chih-Lung Hsieh, Kaohsiung (TW)

(73) Assignee: CHUN YU WORKS & CO., LTD., Kaohsiung (TW)

( * ) Notice: Subject to any disclaimer, the term of this patent is extended or adjusted under 35 U.S.C. 154(b) by 306 days.

(21) Appl. No.: 16/496,074

(22) PCT Filed: Oct. 31, 2018

(86) PCT No.: PCT/CN2018/113010
§ 371 (c)(1),
(2) Date: Sep. 20, 2019

(87) PCT Pub. No.: WO2020/087347
PCT Pub. Date: May 7, 2020

(65) Prior Publication Data
US 2020/0224703 A1   Jul. 16, 2020

(51) Int. Cl.
*F16B 33/02* (2006.01)
(52) U.S. Cl.
CPC .................. *F16B 33/02* (2013.01)
(58) Field of Classification Search
CPC .......... F16B 25/00; F16B 33/00; F16B 33/02
USPC ................................................. 411/411, 421
See application file for complete search history.

(56) References Cited

U.S. PATENT DOCUMENTS

| 1,697,118 A | 1/1929 | Hoke | |
| 4,549,754 A * | 10/1985 | Saunders | E21B 17/042 |
| | | | 285/334 |
| 5,544,993 A * | 8/1996 | Harle | B23G 5/18 |
| | | | 411/414 |
| 5,722,808 A * | 3/1998 | Pritchard | F16B 33/02 |
| | | | 411/366.3 |
| 5,800,107 A * | 9/1998 | Giannuzzi | F16B 25/00 |
| | | | 411/386 |
| 6,394,726 B1 * | 5/2002 | Garvick | F16B 25/0047 |
| | | | 411/411 |

(Continued)

FOREIGN PATENT DOCUMENTS

| CN | 203201984 U | 9/2013 |
| DE | 102010037757 A1 | 3/2012 |

(Continued)

*Primary Examiner* — Roberta S Delisle
(74) *Attorney, Agent, or Firm* — Maschoff Brennan

(57) ABSTRACT

The disclosure provides a bolt including a main body, a head portion and a thread portion. The main body has a central axis. The head portion connects the main body. The thread portion is connected to the main body and runs around the central axis. The thread portion has a bearing surface facing toward the head portion. The bearing surface is a continuous curved surface or has an inflection point. The bearing surface includes a concave curved surface, a convex curved surface and a flank surface. The concave curved surface connects the main body. The convex curved surface is located further away from the main body than the concave curved surface. One side of the convex curved surface connects the concave curved surface, and another side of the convex curved surface connects the flank surface.

10 Claims, 14 Drawing Sheets

(56) References Cited

U.S. PATENT DOCUMENTS

| | | | |
|---|---|---|---|
| 6,722,833 B2 * | 4/2004 | Birkelbach | F16B 25/0021 411/411 |
| 7,293,339 B2 | 11/2007 | Mercer et al. | |
| 8,671,547 B2 | 3/2014 | Matsubayashi et al. | |
| 9,803,679 B1 | 10/2017 | Eidinger | |
| 2006/0222475 A1 * | 10/2006 | Breihan | E21B 17/042 411/411 |
| 2006/0263171 A1 * | 11/2006 | Schwarz | F16B 25/0021 411/411 |
| 2009/0047095 A1 * | 2/2009 | Pritchard | F16B 25/0047 411/411 |
| 2009/0116929 A1 * | 5/2009 | Shea | F16B 39/30 411/311 |
| 2012/0047709 A1 * | 3/2012 | Matsubayashi | F16B 39/30 29/428 |
| 2015/0023761 A1 * | 1/2015 | Pritchard | F16B 25/0021 411/411 |

FOREIGN PATENT DOCUMENTS

| | | |
|---|---|---|
| JP | 11-117929 A | 4/1999 |
| JP | 2006057801 A | 3/2006 |

* cited by examiner

BOLT

CROSS-REFERENCE TO RELATED APPLICATIONS

This non-provisional application priority on the U.S. National Stage of International Application No. PCT/CN2018/113010, filed in China on Oct. 31, 2018, the entire contents of which are hereby incorporated by reference.

TECHNICAL FIELD

The disclosure relates to a bolt, more particularly relates to a bolt capable of preventing self-loosening and thread breakage.

BACKGROUND

In the field of mechanical engineering, threaded fasteners, such as bolt and nut, are one of the most common elements. Bolts are usually used in conjunction with a mating nut to fasten multiple parts together. In detail, the shank and thread of the bolt can be disposed through the parts to be fastened, and the head of the bolt can press against one of the parts when the bolt is placed in the desired position, then the nut can be attached to the bolt and press against the other part. By doing so, the combination of the bolt and the nut can clamp the parts to be fastened inbetween and hold them together.

In normal use, a nut-and-bolt joint holds together because the bolt is under a constant tensile stress called the preload. However, shock, vibration, or dynamic load will increase and decrease the preload with each cycle of movement. If the preload during the vibration cycle is not enough to hold the nut firmly in contact with the bolt and the bearing surface, then the bolt thread is likely to slip relative to the nut. This slippage can ultimately lead to self-loosening of bolt and thus causing the parts to fall apart. To prevent this, some add a washer or coat a friction layer between the contact surfaces among the head of bolt, the parts to be held, and the nut, but these solutions require to perform extra process and material cost.

Alternatively, some try to increase the roughness of the contact surfaces between the joint and the parts to be held, but the self-loosening of bolt will still take place while a small amount of slippage occurring.

Further, the vibration applied on the parts to be held will increase the stress concentration at the sharp corners of the thread. If the stress is overapplied on the thread, such as the stress exceeds the fracture strength of the thread, the plastic deformation of the thread will increase and thus resulting in crack at the thread. If subjected to a large impact force, the crack will develop rapidly, causing the bolt to break.

SUMMARY

Accordingly, the disclosure provides a bolt capable of preventing self-loosening and breakage due to vibration.

One of the embodiments of the disclosure provides a bolt which includes a main body, a head portion and a thread portion. The main body has a central axis. The head portion is connected to the main body. The thread portion is connected to the main body and runs around the central axis. The thread portion has a bearing surface facing toward the head portion. The bearing surface is a continuous curved surface. The bearing surface includes a concave curved surface, a convex curved surface and a flank surface. The concave curved surface connects the main body. The convex curved surface is located further away from the main body than the concave curved surface. One side of the convex curved surface connects the concave curved surface, and another side of the convex curved surface connects the flank surface.

One of the embodiments of the disclosure provides a bolt which includes a main body, a head portion and a thread portion. The main body has a central axis. The head portion is connected to the main body. The thread portion is connected to the main body and runs around the central axis. The thread portion has a bearing surface facing toward the head portion. The bearing surface has an inflection point. The bearing surface includes a concave curved surface, a convex curved surface and a flank surface. The concave curved surface connects the main body. The convex curved surface is located further away from the main body than the concave curved surface. One side of the convex curved surface is connected to the concave curved surface via the inflection point, and another side of the convex curved surface connects the flank surface.

As discussed above, at least one of the embodiments of the disclosure provides a bolt whose thread portion has a bearing surface which is a continuous curved surface or has an inflection point, where the bearing surface at least includes a convex curved surface and a concave curved surface connected to each other, the convex curved surface is located further away from the main body than the concave curved surface, and the concave curved surface connects the main body. In such a configuration, the thread portion would be able to have a larger range of elastic deformation during preload, the elastically deformed thread portion can store a larger amount of elastic potential energy against the fastener engaged with such bolt and thus increasing the frictional force. As a result, the bolt of the disclosure has a greater capability in preventing self-loosening due to vibration. In addition, the bearing surface of such bolt is also able to evenly distribute the stress while an axial load is applied on the thread portion so that the bolt of the disclosure has a greater capability in preventing the thread from breaking due to vibration or sudden impact.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
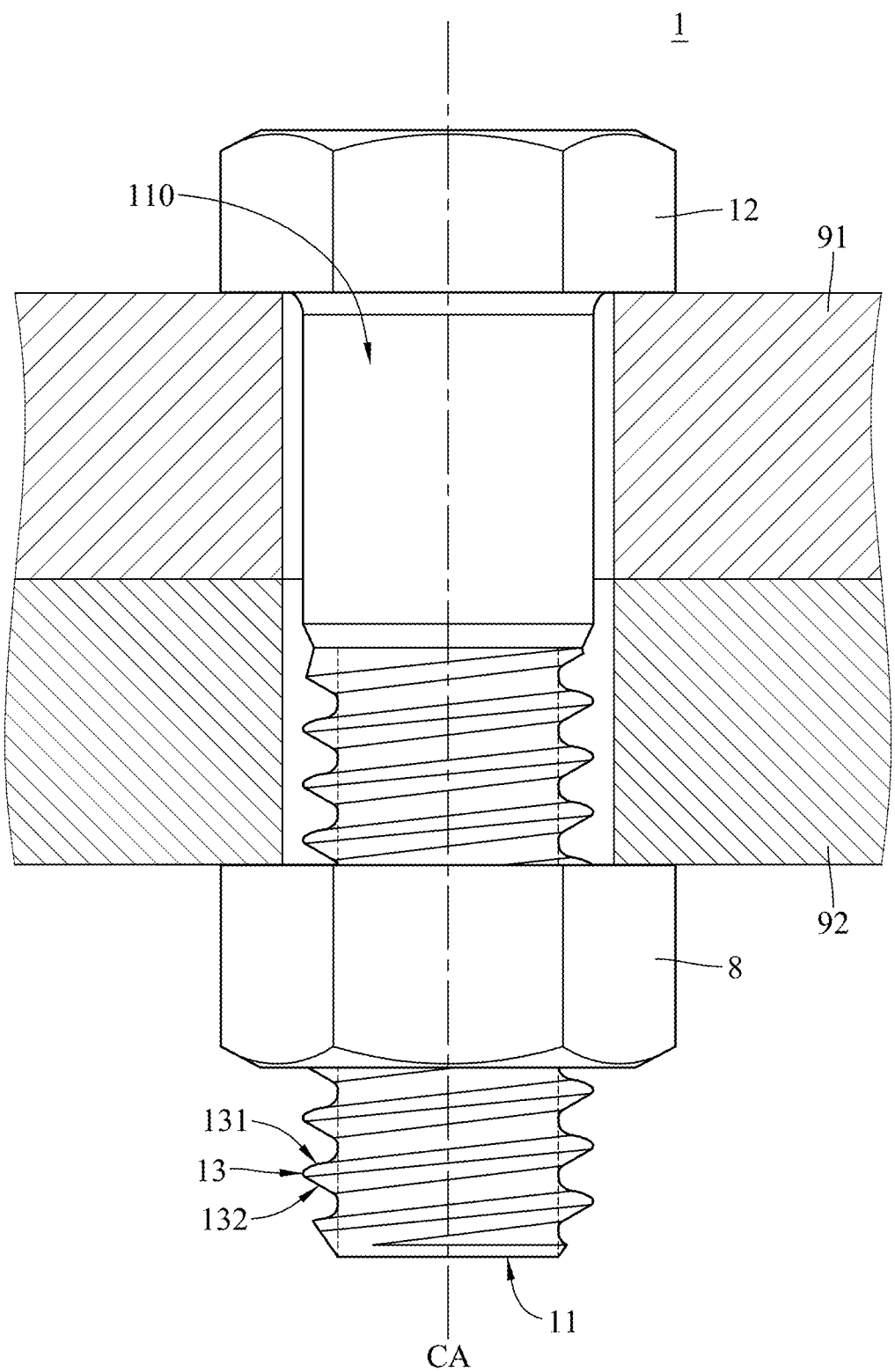
FIG. 1 is a cross-sectional view of a bolt according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the following embodiments are disclosed by the drawings, and for the purpose of illustration, some of the features in the drawings may be simplified and exaggerated, but the present disclosure is not limited thereto.

Further, the terms, such as "end", "portion", "part", "area" and the like may be used in the following to describe specific components and structures or specific features thereon or therebetween, but are not intended to limit these components and structures. And the followings may use terms, such as "substantially", "approximately", or "about"; when these terms are used in combination with size, concentration, temperature or other physical or chemical properties or characteristics, they are used to express that, the deviation existing in the upper and/or lower limits of the range of these properties or characteristics or the acceptable tolerances caused by the manufacturing tolerances or analysis process, would still able to achieve the desired effect.

Figure 2:
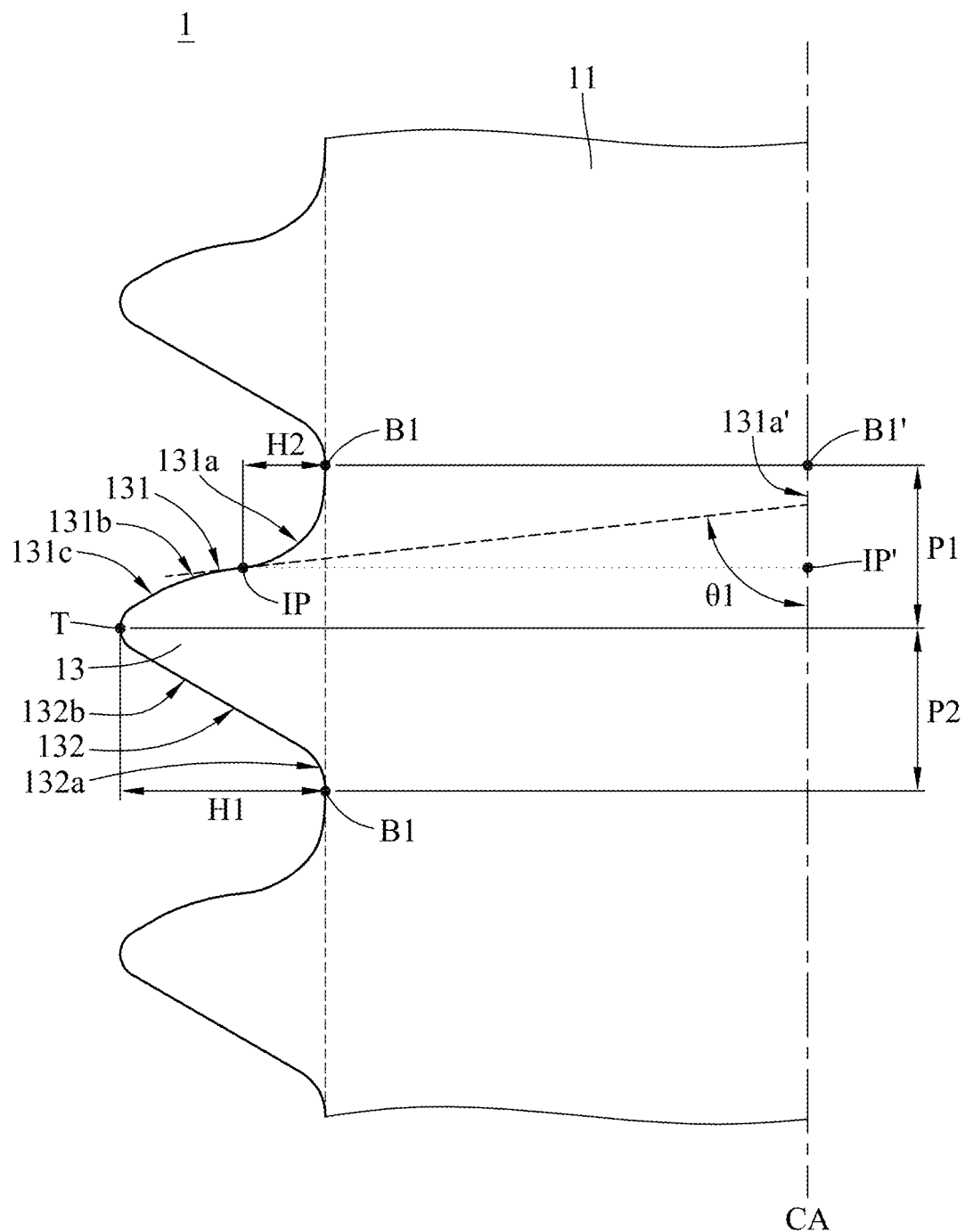
FIG. 2 is a partial enlarged view of the bolt in FIG. 1.

Referring to FIG. 1 and FIG. 2, where FIG. 1 is a cross-sectional view of a bolt according to one embodiment of the disclosure, and FIG. 2 is a partial enlarged view of the bolt in FIG. 1.

In this embodiment, the bolt 1 includes a neck portion 110, a main body 11, a head portion 12 and a thread portion 13. The main body 11 has a central axis CA. The head portion 12 is connected to the main body 11 via the neck portion 110. The thread portion 13 is a raised helical structure formed on the main body 11 and running around the central axis CA of the main body 11. The neck portion 110 is connected to and located between the main body 11 and the head portion 12, but the disclosure is not limited thereto. In some other embodiments, the neck portion 110 may be omitted; that is, the head portion 12 may be directly connected to the main body 11.

As shown in FIG. 1, assembling and fastening the parts 91 and 92 may include the following steps: inserting the neck portion 110 and the main body 11 of the bolt 1 through the holes of the parts 91 and 92; and then screwing a fastener 8 which has a female thread onto the thread portion 13 on the main body 11. The fastener 8 shown in FIG. 1 is, for example, a nut, but the disclosure is not limited thereto. The fastener 8 may be other suitable fastener mating the bolt of the disclosure. As the bolt 1 is fixed to the parts 91 and 92, the head portion 12 presses against, for example, the part 91, and the fastener 8 presses against, for example, the part 92. By doing so, the bolt 1 is under a constant tensile stress called the preload. The preload pulls the thread of fastener 8 against the thread portion 13 of the bolt 1 so that the head portion 12 of the bolt 1 and the fastener 8 can clamp the parts 91 and 92 together.

As shown in FIG. 2, the thread portion 13 has a bearing surface 131, a non-bearing surface 132, a crest T and a root B 1. The bearing surface 131 substantially faces toward the head portion 12. The non-bearing surface 132 substantially faces away from the head portion 12. The crest T is the part of the thread portion 13 located furthest away from the central axis CA, and the root B1 is the part of the thread portion 13 located nearest the central axis CA. The side of the bearing surface 131 away from the central axis CA and the side of the non-bearing surface 132 away from the central axis CA are both connected to the crest T. The side of the bearing surface 131 relatively close to the central axis CA connects the root B1 and is on the main body 11, and the side of the non-bearing surface 132 relatively close to the central axis CA connects the root B1 and is also on the main body 11.

The bearing surface 131 is a continuous curved surface. The bearing surface 131 includes a concave curved surface 131a, a convex curved surface 131b and a flank surface 131c. The bearing surface 131 has an inflection point IP. The concave curved surface 131a connects the main body 11 at the root B1. The convex curved surface 131b is located further away from the main body 11 than the concave curved surface 131a. The convex curved surface 131b connects the concave curved surface 131a via the inflection point IP. That is, the inflection point IP is the joint between the concave curved surface 131a and the convex curved surface 131b. The convex curved surface 131b connects the flank surface 131c, and the concave curved surface 131a connects the flank surface 131c via the convex curved surface 131b. The crest T is located between and connected to the bearing surface 131 and the non-bearing surface 132. The concave curved surface 131a is located between and connected to the inflection point IP and the main body 11. An orthogonal projection 131a' of the concave curved surface 131a onto the central axis CA is located between an orthogonal projection IP' of the inflection point IP onto the central axis CA and an orthogonal projection B1' of the root B1 onto the central axis CA. In this embodiment, from the viewpoint of FIG. 2, the flank surface 131c may be a flat surface, but the disclosure is not limited thereto. In some other embodiments, the flank surface 131c, from the viewpoint of FIG. 2, may be a concave curved surface or a convex curved surface. In the case that the flank surface 131c, from the viewpoint of FIG. 2, is a convex curved surface, the flank surface 131c may have a radius of curvature greater than that of the convex curved surface 131b.

In this embodiment, the non-bearing surface 132 includes a connecting surface 132a and a non-bearing flank surface 132b. One end of the connecting surface 132a is on the main body 11, and the other end of the connecting surface 132a is connected to the non-bearing flank surface 132b. In this embodiment, the non-bearing flank surface 132b, from the viewpoint of FIG. 2, may be a flat surface, but the disclosure is not limited thereto. In some other embodiments, the non-bearing flank surface 132b, from the viewpoint of FIG. 2, may be a convex curved surface or a concave curved surface.

In this embodiment, a tangent line to the inflection point IP of the bearing surface 131 is at an angle θ1 ranging between 75° and 90° to the central axis CA, in some embodiments, the angle θ1 is preferably ranging between 77.5° and 82.5°. The furthest distance from the peak of the thread portion 13 to the main body 11 (i.e., the straight distance from the crest T to the root B1 along the radial direction of the main body 11) is denoted as H1, where H1 can also be called a crest height. The straight distance from the inflection point IP to the main body 11 is denoted as a H2, and the straight distance H2 is ⅜-½ of the crest height H1. The length of the orthogonal projection of the bearing surface 131 onto the central axis CA is denoted as P1, and the length of the orthogonal projection of the non-bearing surface 132 onto the central axis CA is denoted as P2. The length P1 is equal to the length P2.

In this embodiment, the bearing surface 131 is a continuous curved surface but may or may not have a small manufacturing deviation resulted from various reasons, such as manufacturing technique differences or surface roughness differences, but the disclosure is not limited thereto.

Figure 3:
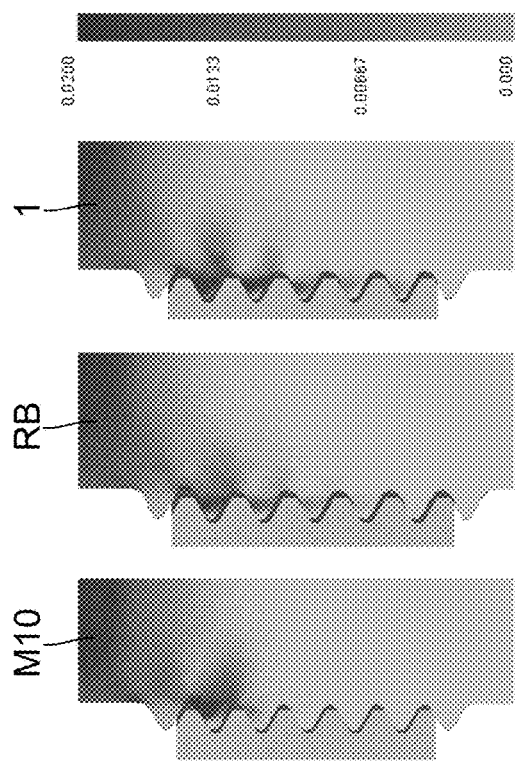
FIG. 3 illustrates a comparison among the strain simulations of a standard bolt, a reference bolt and the bolt shown in FIG. 1 while the nut has an axial displacement of 0.15
Figure 4:
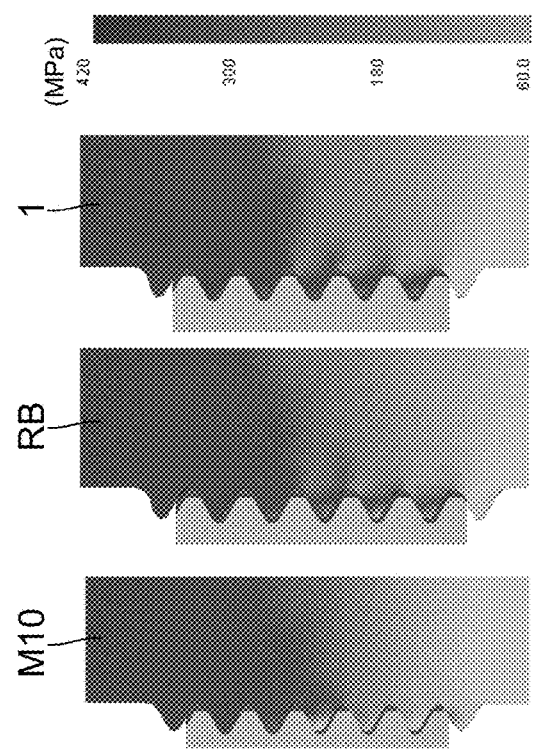
FIG. 4 illustrates a comparison among the stress simulations of the standard bolt, the reference bolt and the bolt shown in FIG. 1 while the nut has an axial displacement of 0.15 mm.
Figure 5:
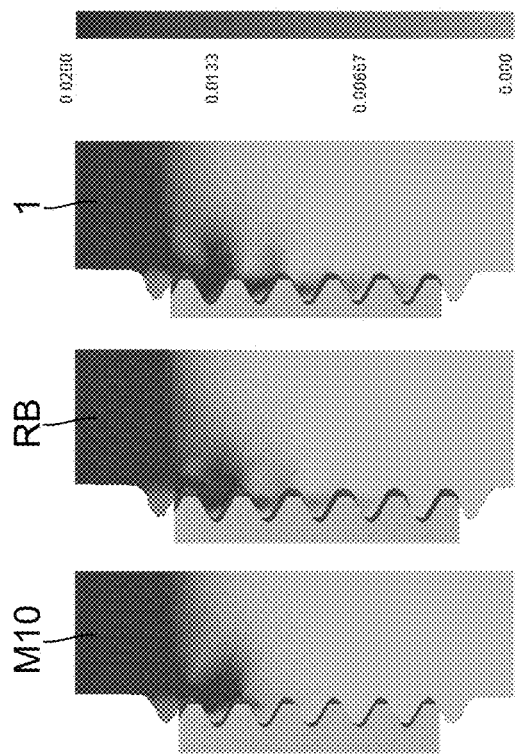
FIG. 5 illustrates a comparison among the strain simulations of a standard bolt, the reference bolt and the bolt shown in FIG. 1 while the nut has an axial displacement of 0.30 mm.
Figure 6:
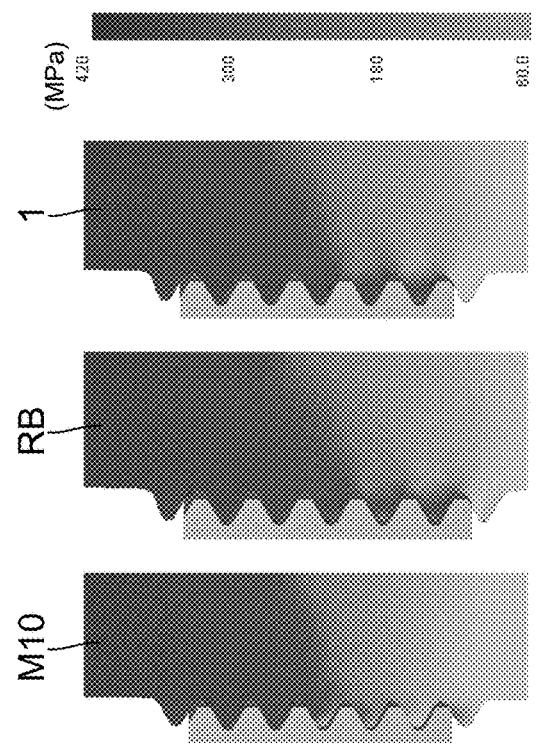
FIG. 6 illustrates a comparison among the stress simulations of the standard bolt, the reference bolt and the bolt shown in FIG. 1 while the nut has an axial displacement of 0.30 mm.

Referring to FIGS. 3-6, where FIG. 3 illustrates a comparison among the strain simulations of a standard bolt, a reference bolt and the bolt shown in FIG. 1 while the nut has an axial displacement of 0.15 mm, FIG. 4 illustrates a comparison among the stress simulations of the standard bolt, the reference bolt and the bolt shown in FIG. 1 while the nut has an axial displacement of 0.15 mm, FIG. 5 illustrates a comparison among the strain simulations of a standard bolt, the reference bolt and the bolt shown in FIG. 1 while the nut has an axial displacement of 0.30 mm, and FIG. 6 illustrates a comparison among the stress simulations of the standard bolt, the reference bolt and the bolt shown in FIG. 1 while the nut has an axial displacement of 0.30 mm.

In each of FIGS. 3-6, the figures from the left to the right are the standard bolt M10, the reference bolt RB and the bolt 1 of FIG. 1, where the nut used in the above simulations was produced according to the standards of M10JIS and has a thread pitch of 1.5 mm, and the nut is able to be engaged with five threads at the same time. The standard bolt M10 is produced according to the standards of M10JIS and has a thread pitch of 1.5 mm. The reference bolt RB is modified from the standard bolt M10, where the reference bolt RB further has a curved recess at the side of the bearing surface close to the root.

Therefore, the bearing surface of the reference bolt RB has a curved recess and part of the thread profile of the standard bolt M10, where the thread profile of the standard bolt M10 can also be called M10 thread. On the bearing surface of the reference bolt RB, the curved recess and the part of the M10 thread do not form a continuous surface, so the bearing surface of the reference bolt RB does not have any inflection point. On the bolt 1, H2/H1 is ½, and θ1 is 80.5°.

FIG. 3 and FIG. 4 show that the nut has moved downward an axial displacement of 0.15 mm. As shown in FIG. 3, the nut causes, for example, strain on the first and second threads of the standard bolt M10, the nut causes, for example, strain on the first to fourth threads of the reference bolt RB, and the nut causes, for example, strain on the first to fifth threads of the bolt 1. The strain on these bolts produce tensile stress. As shown in FIG. 4, the standard bolt M10 distributes the stress to, for example, the first to third threads, the reference bolt RB distributes the stress to, for example, the first to fifth threads, and the bolt 1 distributes the stress to the first to fifth threads. Particularly, the stress distribution on the thread of the bolt 1 is much more even compared to that on the reference bolt RB.

FIG. 5 and FIG. 6 show that the nut has moved downward an axial displacement of 0.30 mm. As shown in FIG. 5, the nut causes strain on, for example, the first and second threads of the standard bolt M10, the nut causes strain on, for example, the first to fourth threads of the reference bolt RB, the nut causes strain on, for example, the first to fifth threads of the bolt 1. The strain on these bolts produce tensile stress. As shown in FIG. 6, the standard bolt M10 distributes the stress to, for example, the first to fourth threads, the reference bolt RB distributes the stress to, for example, the first to fifth threads, and the bolt 1 distributes the stress to, for example, the first to fifth threads. Particularly, the stress distribution on the threads of the bolt 1 is much more even compared to that on the reference bolt RB.

Accordingly, comparing to the standard bolt M10 and the reference bolt RB, under the same condition, the bolt 1 has more threads subjected to strain, such that the bolt 1 has more threads to store elastic potential energy against the nut and thus increasing the frictional force. Therefore, the bolt 1 is more capable of preventing self-loosening due to vibration. Further, since the stress distribution on the threads of the bolt 1 is much more even, the thread of the bolt 1 is more likely to prevent breakage due to vibration or sudden shock.

Also, comparing to the results of the axial displacement of 0.15 mm and the axial displacement of 0.30 mm, the strain and the stress distribution on the thread portion of the bolt 1 do not have a significant change. Therefore, if the vibration causes the nut to be axially displaced, the strain and the stress distribution on the thread portion of the bolt 1 will not have a significant change, such that the frictional force between the bolt 1 and the nut will not have a significant change, either. This proves that the bolt 1 is more likely to prevent self-loosening due to vibration.

Figure 7:
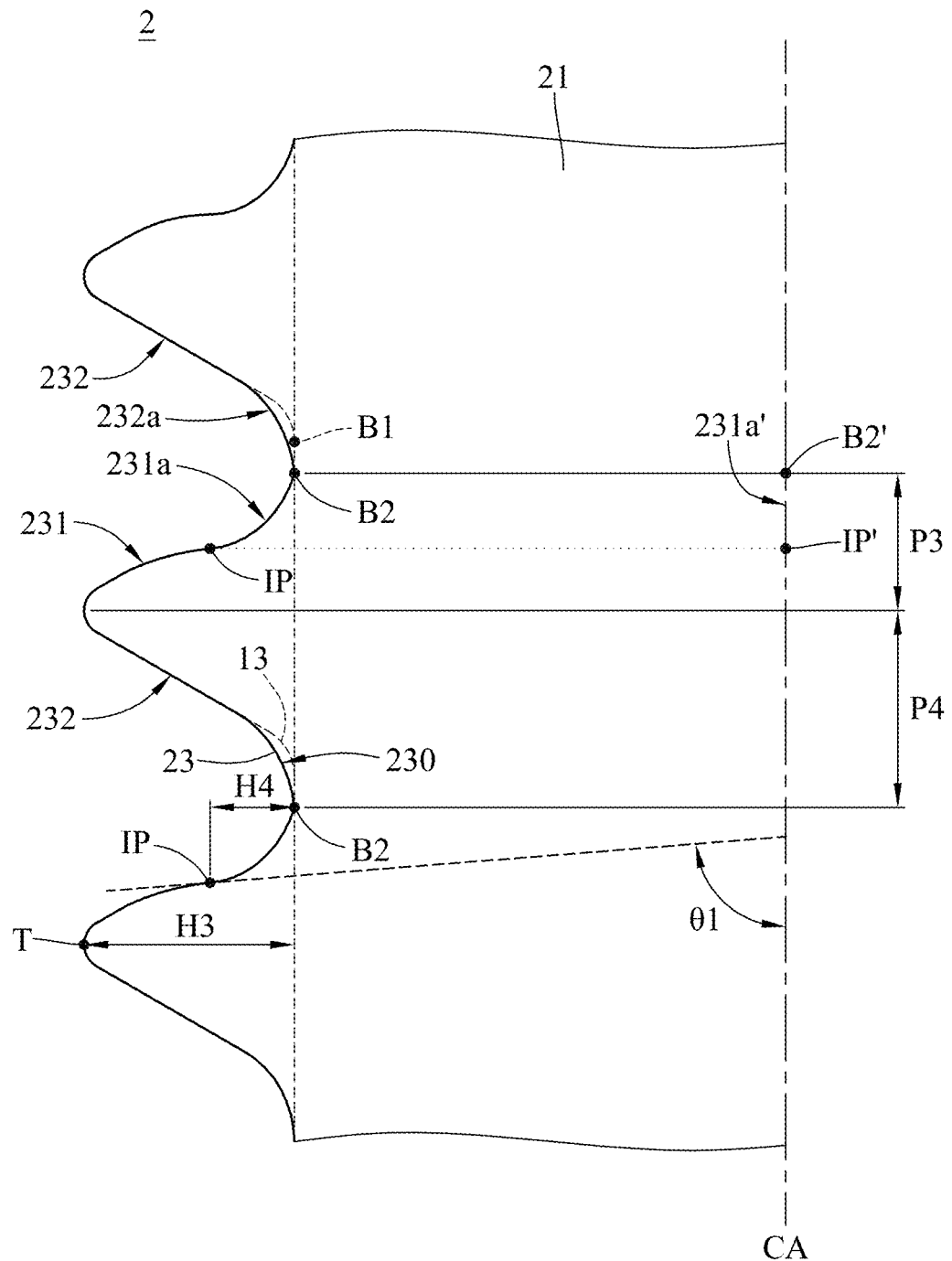
FIG. 7 is a partial enlarged cross-sectional side view of a bolt according to another embodiment of the disclosure.

Referring to FIG. 7, a partial enlarged cross-sectional side view of a bolt 2 according to another embodiment of the disclosure is provided. The bolt 2 in FIG. 7 is similar to the bolt 1 in FIG. 1, so only the differences therebetween will be illustrated hereinafter. In the bolt 2, the length of the orthogonal projection of a bearing surface 231 onto the central axis CA is denoted as P3, the length of the orthogonal projection of the non-bearing surface 232 onto the central axis CA is denoted as P4, and the length P3 is smaller than the length P4. In other words, the position of a root B2 of the bolt 2 is located further away from the head portion of the bolt 2 compared to that of the root B1 of the bolt 1. An orthogonal projection 231a' of a concave curved surface 231a onto the central axis CA is located between an orthogonal projection IP' of the inflection point IP onto the central axis CA and an orthogonal projection B2' of the root B2 onto the central axis CA. Also, comparing to the thread portion 13 of the bolt 1, a thread portion 23 of the bolt 2 further has a volume 230 at the side of the thread portion 23 having a non-bearing surface 232. Comparing to that of the bolt 1, the volume 230 makes the thread portion 23 has an improved mechanical strength.

In the bolt 2, a tangent line to the inflection point IP of the bearing surface 231 is at an angle θ1 ranging between 75° and 90° to the central axis CA, in some embodiments, the angle θ1 is preferably ranging between 77.5° and 82.5°. In addition, in the bolt 2, the straight distance from the crest T to the root B1 along the radial direction of the main body 21 is denoted as H3, where H3 can also be called a crest height, and the straight distance from the inflection point IP to the main body 21 is denoted as a H4, where the straight distance H4 is ⅜-½ of the crest height H3.

In this embodiment, the concave curved surface 231a of the bearing surface 231 has a smaller radius of curvature than that of a connecting surface 232a of the non-bearing surface 232, but the disclosure is not limited thereto.

Figure 8:
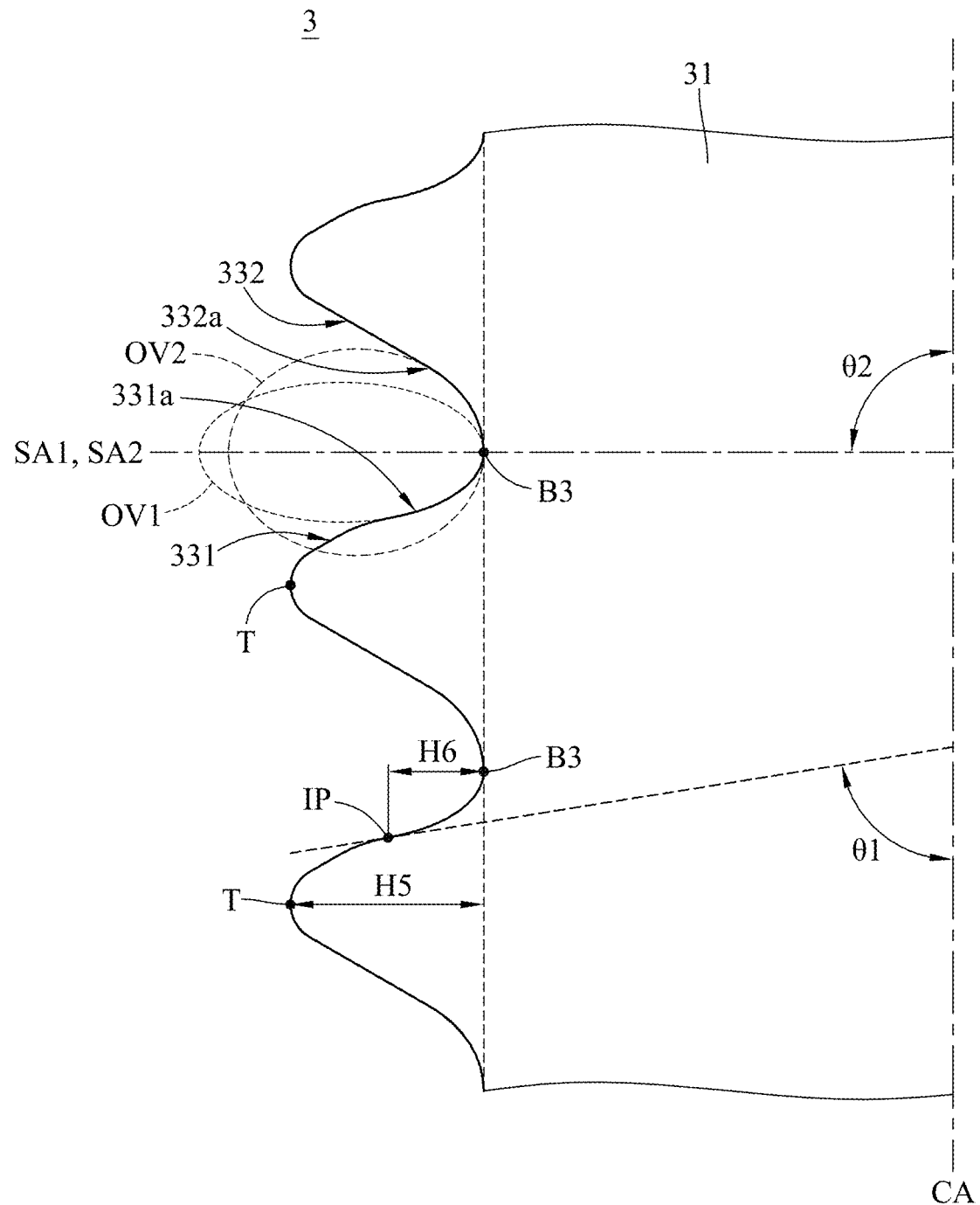
FIG. 8 is a partial enlarged cross-sectional side view of a bolt according to yet another embodiment of the disclosure.

For example, referring to FIG. 8, a partial enlarged cross-sectional side view of a bolt 3 according to yet another embodiment of the disclosure is provided. In FIG. 3, a tangent line to the inflection point IP of a bearing surface 331 is at an angle θ1 ranging between 75° and 90° to the central axis CA, in some embodiments, the angle θ1 is preferably ranging between 77.5° and 82.5°. In addition, in the bolt 3, the straight distance from the crest T to the root B1 along the radial direction of a main body 31 is denoted as H5, where H5 can also be called a crest height, and the straight distance from the inflection point IP to the main body 31 is denoted as a H6, where the straight distance H6 is ⅜-½ of the crest height H5.

The bolt 3 in FIG. 8 is similar to the bolt 2 in FIG. 7, so only the differences therebetween will be illustrated hereinafter. In the bolt 3, a concave curved surface 331a of the bearing surface 331 fits part of a first geometrical curve OV1, and a connecting surface 332a of a non-bearing surface 332 fits part of a second geometrical curve OV2. The first geometrical curve OV1 has a first line of symmetry SA1, and the second geometrical curve OV2 has a second line of symmetry SA2. The first geometrical curve OV1 is different from the second geometrical curve OV2. In other words, the first geometrical curve OV1 and the second geometrical curve OV2 are different in shape. The first line of symmetry SA1 overlaps the second line of symmetry SA2, the first line of symmetry SA1 and the second line of symmetry SA2 pass through a root B3, and the first line of symmetry SA1 and the second line of symmetry SA2 are at an angle θ2 of 90° to the central axis CA.

In this embodiment, the shape of the first geometrical curve OV1 is a relatively long and thin oval, and the shape of the second geometrical curve OV2 is a relatively short and fat oval, but the disclosure is not limited thereto. In some other embodiments, each of the first geometrical curve OV1 and the second geometrical curve OV2 may be any other suitable geometrical curves, such as part of one of the curved lines of a hyperbolic or part of a parabolic. Also, the first geometrical curve OV1 and the second geometrical curve OV2 may be different types of geometrical curves.

Figure 9:
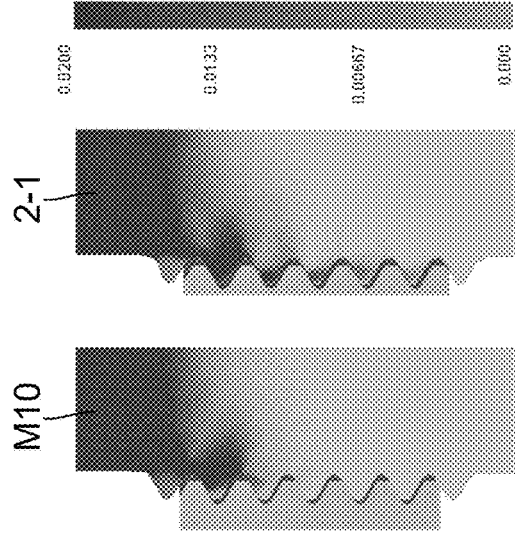
FIG. 9 illustrates a comparison between the strain simulations of the standard bolt and the bolt in FIG. 7 while the nut has an axial displacement of 0.15 mm under the conditions $\theta 1=80.5°$ and H4/H3=½.
Figure 10:
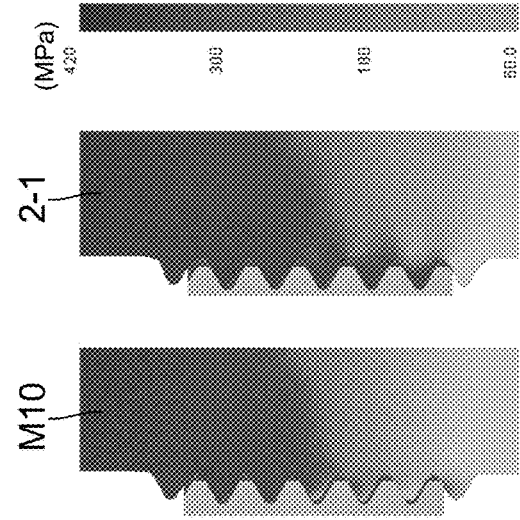
FIG. 10 illustrates a comparison between the stress simulations of the standard bolt and the bolt in FIG. 7 while the nut has an axial displacement of 0.15 mm under the conditions $\theta 1=80.5°$ and H4/H3=½.
Figure 11:
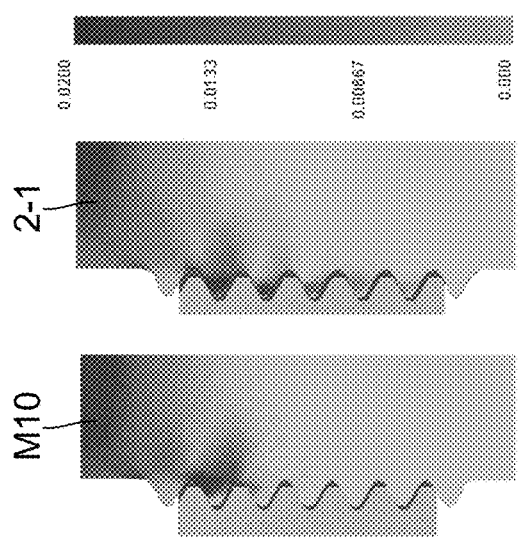
FIG. 11 illustrates a comparison between the strain simulations of the standard bolt and the bolt in FIG. 7 while the nut has an axial displacement of 0.30 mm under the conditions $\theta 1=80.5°$ and H4/H3=½.
Figure 12:
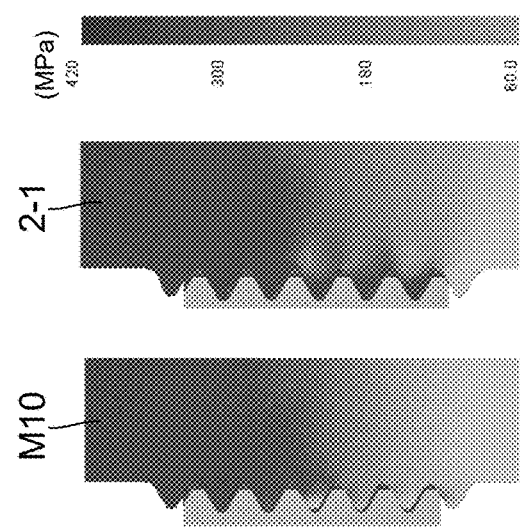
FIG. 12 illustrates a comparison between the stress simulations of the standard bolt and the bolt in FIG. 7 while the nut has an axial displacement of 0.30 mm under the conditions $\theta 1=80.5°$ and H4/H3=½.

Referring to FIG. 9, FIG. 10, FIG. 11, and FIG. 12, where FIG. 9 illustrates a comparison between the strain simulations of the standard bolt and the bolt in FIG. 7 while the nut has an axial displacement of 0.15 mm under the conditions θ1=80.5° and H4/H3=½, FIG. 10 illustrates a comparison between the stress simulations of the standard bolt and the bolt in FIG. 7 while the nut has an axial displacement of 0.15 mm under the conditions θ1=80.5° and H4/H3=½, FIG. 11 illustrates a comparison between the strain simulations of the standard bolt and the bolt in FIG. 7 while the nut has an axial displacement of 0.30 mm under the conditions θ1=80.5° and H4/H3=½, and FIG. 12 illustrates a comparison between the stress simulations of the standard bolt and the bolt in FIG. 7 while the nut has an axial displacement of 0.30 mm under the conditions θ1=80.5° and H4/H3=1/2. Note that the bolt of the disclosure used in FIGS. 9 to 12 is a bolt produced according to the above configurations of the bolt 2 shown in FIG. 7 under the conditions θ1=80.5° and H4/H3=½, and therefore can be denoted as 2-1.

In each of FIGS. 9-12, the figures from the left to the right are the standard bolt M10 and the bolt 2-1. The nut used in the above simulations was produced according to the standards of M10JIS and has a thread pitch of 1.5 mm, and the nut is able to be engaged with five threads at the same time.

FIG. 9 and FIG. 10 show that the nut has moved downward an axial displacement of 0.15 mm. As shown in FIG. 9, the nut causes strain on, for example, the first and second threads of the standard bolt M10, the nut causes strain on, for example, the first to fifth threads of the bolt 2-1. As shown in FIG. 10, the standard bolt M10 distributes the stress to, for example, the first to third threads, and the bolt 2-1 distributes the stress to, for example, the first to fifth threads.

FIG. 11 and FIG. 12 show that the nut has moved downward an axial displacement of 0.30 mm. As shown in FIG. 11, the nut causes strain on, for example, the first and second threads of the standard bolt M10, the nut causes strain on, for example, the first to fifth threads of the bolt 2-1. As shown in FIG. 12, the standard bolt M10 distributes the stress to the first to fourth threads, and the bolt 2-1 distributes the stress to, for example, the first to fifth threads.

Accordingly, comparing to the standard bolt M10, the bolt 2-1 has more threads subjected to strain so as to be able to have more threads to store elastic potential energy against the nut and thus increasing the frictional force. Therefore, the bolt 2-1 is more capable of preventing self-loosening due to vibration. Further, since the stress distribution on the threads of the bolt 2-1 is much more even, the thread of the bolt 2-1 is more likely to prevent breakage due to vibration or sudden shock.

Also, comparing to the results of the axial displacement of 0.15 mm and the axial displacement of 0.30 mm, the strain and the stress distribution on the thread portion of the bolt 2-1 do not have a significant change. Therefore, if the vibration causes the nut to be axially displaced, the strain and the stress distribution on the thread portion of the bolt 2-1 will not have a significant change, such that the frictional force between the bolt 2-1 and the nut will not have a significant change, either. This proves that the bolt 2-1 is more likely to prevent self-loosening due to vibration.

The followings illustrate other simulations in regard to different θ1 and H4/H3.

Figure 13:
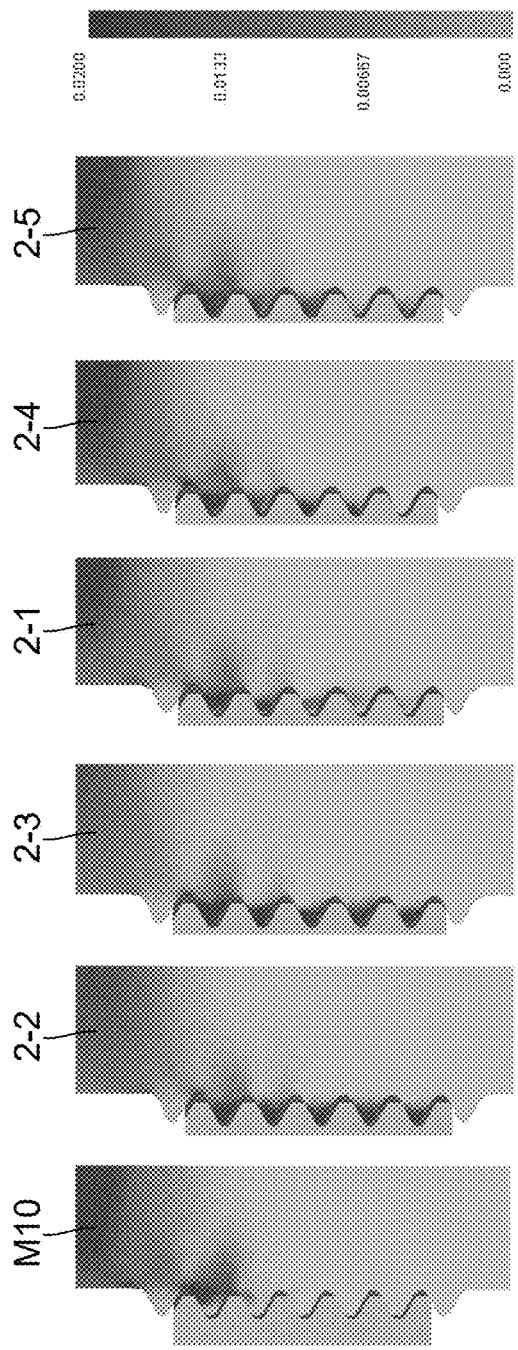
FIG. 13 illustrates a comparison among the strain simulations of the standard bolt and a group of bolts, according to the embodiment of FIG. 7 under the conditions $\theta 1=75°$, 77.5°, 80.5°, 82.5°, 90° and H4/H3=½, while the nut has an axial displacement of 0.15 mm.
Figure 14:
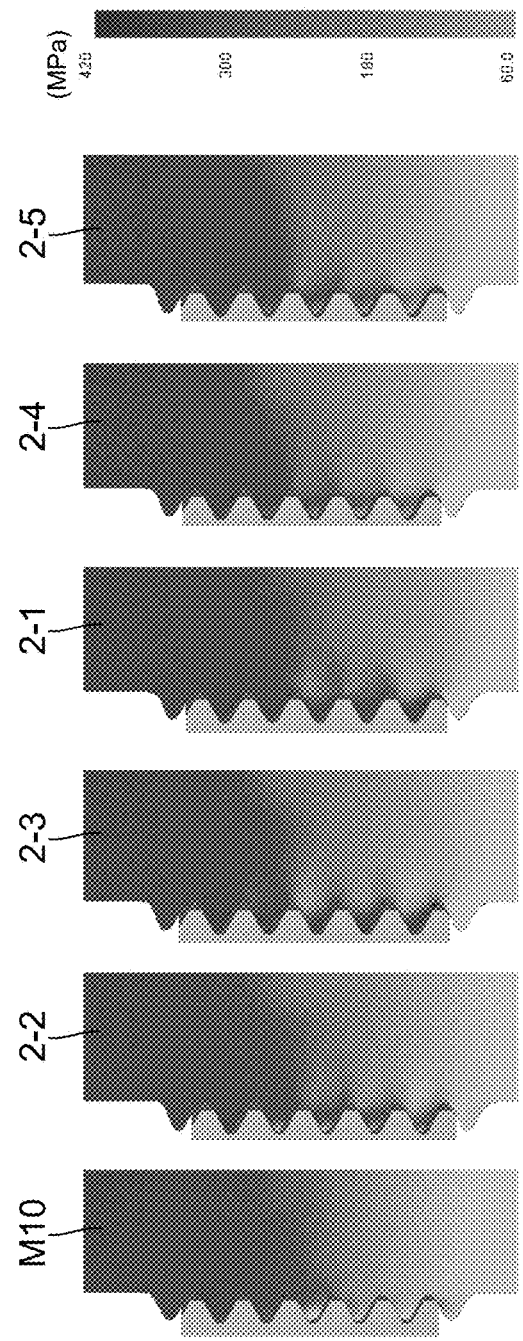
FIG. 14 illustrates a comparison among the stress simulations of the standard bolt and a group of bolts, according to the embodiment of FIG. 7 under the conditions $\theta 1=75°$, 77.5°, 80.5°, 82.5°, 90° and H4/H3=½, while the nut has an axial displacement of 0.15 mm.
Figure 15:
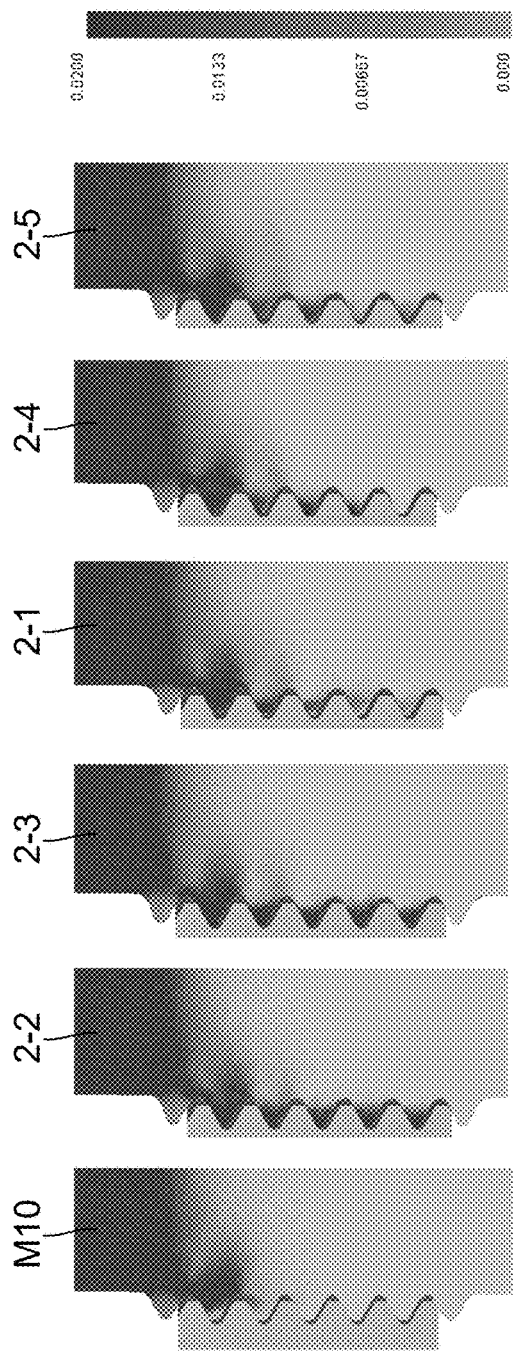
FIG. 15 illustrates a comparison among the strain simulations of the standard bolt and a group of bolts, according to the embodiment of FIG. 7 under the conditions $\theta 1=75°$, 77.5°, 80.5°, 82.5°, 90° and H4/H3=½, while the nut has an axial displacement of 0.30 mm.
Figure 16:
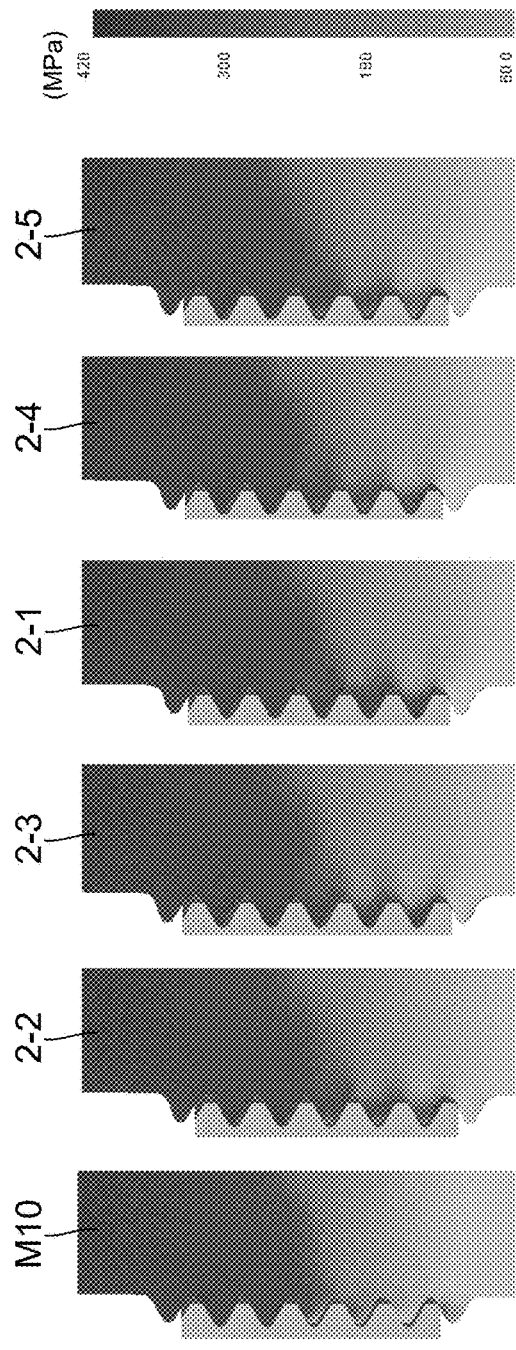
FIG. 16 illustrates a comparison among the stress simulations of the standard bolt and a group of bolts, according to the embodiment of FIG. 7 under the conditions $\theta 1=75°$, 77.5°, 80.5°, 82.5°, 90° and H4/H3=½, while the nut has an axial displacement of 0.30 mm.

Referring to FIG. 13, FIG. 14, FIG. 15 and FIG. 16, where FIG. 13 illustrates a comparison among the strain simulations of the standard bolt and a group of bolts, according to the embodiment of FIG. 7 under the conditions θ1=75°, 77.5°, 80.5°, 82.5°, 90° and H4/H3=½, while the nut has an axial displacement of 0.15 mm; FIG. 14 illustrates a comparison among the stress simulations of the standard bolt and a group of bolts, according to the embodiment of FIG. 7 under the conditions θ1=75°, 77.5°, 80.5°, 82.5°, 90° and H4/H3=½, while the nut has an axial displacement of 0.15 mm; FIG. 15 illustrates a comparison among the strain simulations of the standard bolt and a group of bolts, according to the embodiment of FIG. 7 under the conditions θ1=75°, 77.5°, 80.5°, 82.5°, 90° and H4/H3=½, while the nut has an axial displacement of 0.30 mm; FIG. 16 illustrates a comparison among the stress simulations of the standard bolt and a group of bolts, according to the embodiment of FIG. 7 under the conditions θ1=75°, 77.5°, 80.5°, 82.5°, 90° and H4/H3=½, while the nut has an axial displacement of 0.30 mm. Note that the bolts of the disclosure used in FIGS. 14 to 16 are bolts produced according to the above configurations of the bolt 2 shown in FIG. 7 under the conditions θ1=75°, 77.5°, 80.5°, 82.5°, 90° and H4/H3=½, and therefore these bolts can be denoted as 2-2, 2-3, 2-1, 2-4 and 2-5.

In each of FIGS. 13-16, the figures from the left to the right are the standard bolt M10, a bolt 2-2 with θ1=75° and H4/H3=½, a bolt 2-3 with θ1=77.5° and H4/H3=½, a bolt 2-1 with θ1=80.5° and H4/H3=½, a bolt 2-4 with θ1=82.5° and H4/H3=½, and a bolt-5 with θ1=90° and H4/H3=1/2. The nut used in the above simulations was produced according to the standards of M10JIS and has a thread pitch of 1.5 mm, and the nut is able to be engaged with five threads at the same time.

FIG. 13 and FIG. 14 show that the nut has moved downward an axial displacement of 0.15 mm. As shown in FIG. 13, the nut causes strain on, for example, the first and second threads of the standard bolt M10; the nut causes strain on, for example, the first to fifth threads of the bolt 2-2; the nut causes strain on, for example, the first to fifth threads of the bolt 2-3; the nut causes strain on, for example, the first to fifth threads of the bolt 2-1; the nut causes strain on, for example, the first to fourth threads of the bolt 2-4; and the nut causes strain on, for example, the first to fifth threads of the bolt 2-5.

As shown in FIG. 14, the standard bolt M10 distributes the stress to, for example, the first to third threads, and the bolt 2-2, bolt 2-3, bolt 2-1, bolt 2-4 and bolt 2-5 all can distribute the stress to, for example, their first to fifth threads.

FIG. 15 and FIG. 16 show that the nut has moved downward an axial displacement of 0.30 mm. As shown in FIG. 15, the nut causes strain on, for example, the first and second threads of the standard bolt M10; the nut causes strain on, for example, the first to fifth threads of the bolt 2-2; the nut causes strain on, for example, the first to fifth threads of the bolt 2-3; the nut causes strain on, for example, the first to fifth threads of the bolt 2-1; the nut causes strain on, for example, the first to fourth threads of the bolt 2-4; and the nut causes strain on, for example, the first to fifth threads of the bolt 2-5.

As shown in FIG. 16, the standard bolt M10 distributes the stress to, for example, the first to third threads, and the bolt 2-2, bolt 2-3, bolt 2-1, bolt 2-4 and bolt 2-5 all can distribute the stress to, for example, their first to fifth threads.

Accordingly, comparing to the standard bolt M10, the bolt 2-2, bolt 2-3, bolt 2-1, bolt 2-4 and bolt 2-5, that satisfy the conditions of θ1=75°-90° and H4/H3=½, each have more threads subjected to strain so as to be able to have more threads to store elastic potential energy against the nut and thus increasing the frictional force. Therefore, the bolt 2-2, bolt 2-3, bolt 2-1, bolt 2-4 and bolt 2-5, that satisfy the conditions of θ1=75°-90° and H4/H3=½, are more capable of preventing self-loosening due to vibration. Further, since the stress distribution on the threads of the bolt 2-2, bolt 2-3, bolt 2-1, bolt 2-4 and bolt 2-5 is much more even, the threads of the bolt 2-2, bolt 2-3, bolt 2-1, bolt 2-4 and bolt 2-5 are more likely to prevent breakage due to vibration or sudden shock.

Also, comparing to the results of the axial displacement of 0.15 mm and the axial displacement of 0.30 mm, the strain and the stress distribution on the thread portion of each of the bolt 2-2, bolt 2-3, bolt 2-1, bolt 2-4 and bolt 2-5, that satisfy the above conditions, do not have a significant change. Therefore, if the vibration causes the nut to be axially displaced, the strain and the stress distribution on the thread portion of each of the bolt 2-2, bolt 2-3, bolt 2-1, bolt 2-4 and bolt 2-5 will not have a significant change, such that the frictional force between the bolt 2-2, bolt 2-3, bolt 2-1, bolt 2-4 and bolt 2-5 and the nut will not have a significant change, either. This proves that the bolt 2-2, bolt 2-3, bolt 2-1, bolt 2-4 and bolt 2-5 are more likely to prevent self-loosening due to vibration.

Figure 17:
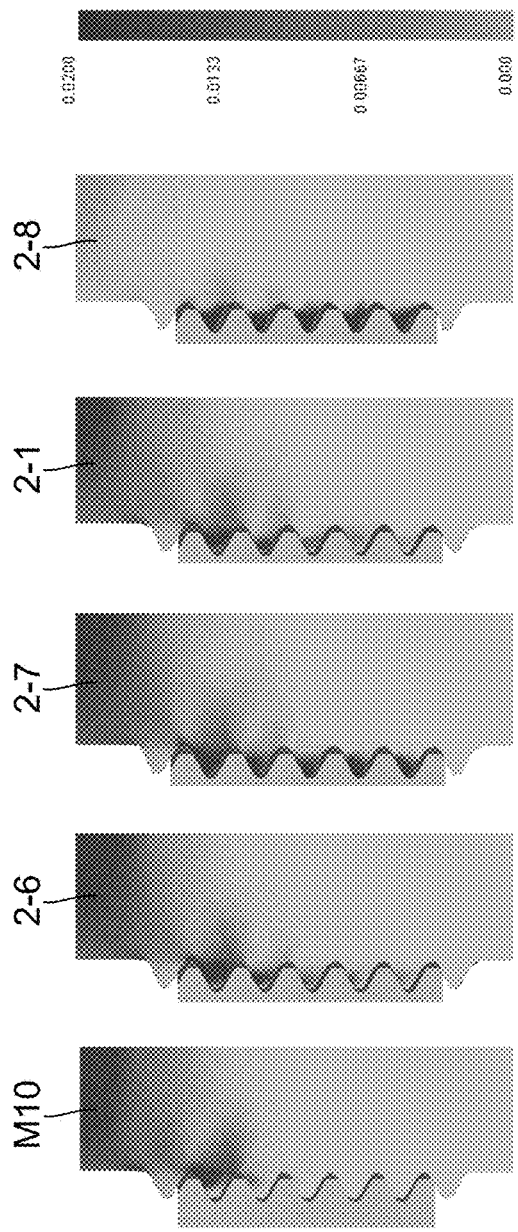
FIG. 17 illustrates a comparison among the strain simulations of the standard bolt and a group of bolts, according to the embodiment of FIG. 7 under the conditions $\theta 1=80.5°$ and H4/H3=⅜, ⁷⁄₁₆, ½, ⅝, while the nut has an axial displacement of 0.15 mm.
Figure 18:
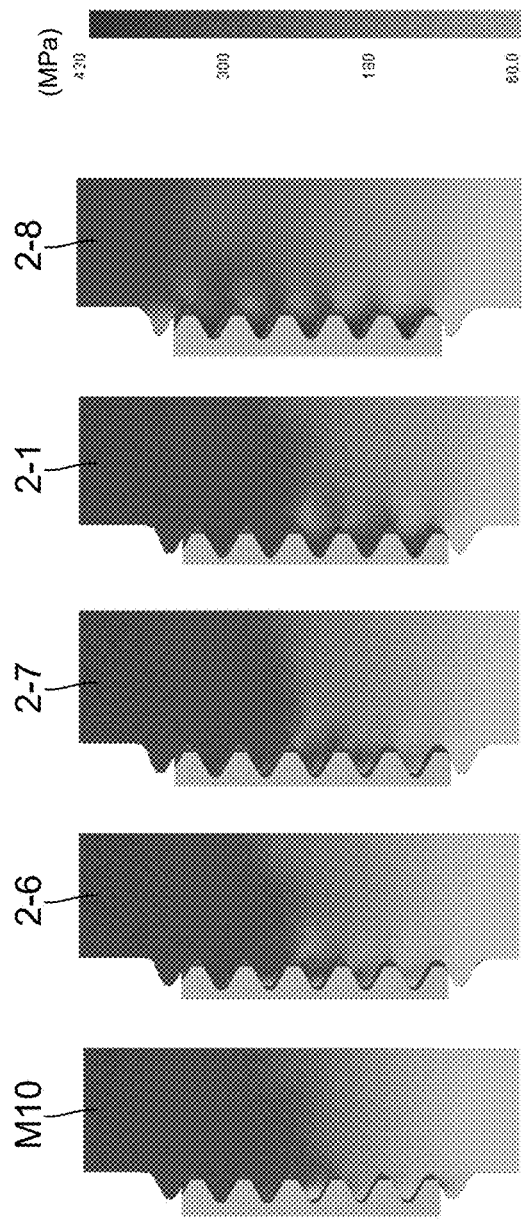
FIG. 18 illustrates a comparison among the stress simulations of the standard bolt and a group of bolts, according to the embodiment of FIG. 7 under the conditions $\theta 1=80.5°$ and H4/H3=⅜, ⁷⁄₁₆, ½, ⅝, while the nut has an axial displacement of 0.15 mm.
Figure 19:
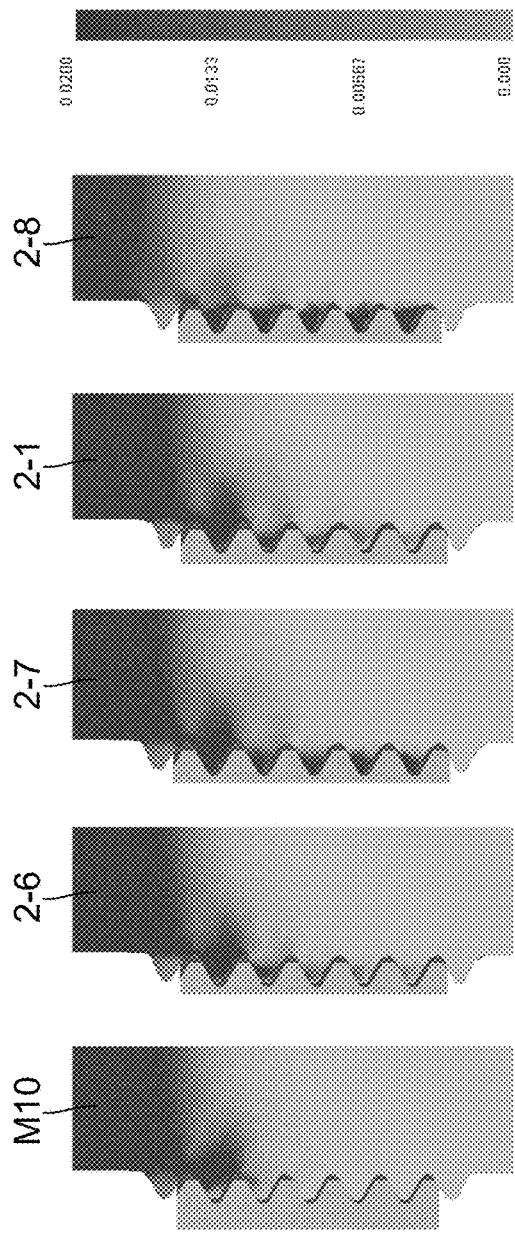
FIG. 19 illustrates a comparison among the strain simulations of the standard bolt and a group of bolts, according to the embodiment of FIG. 7 under the conditions $\theta 1=80.5°$ and H4/H3=⅜, ⁷⁄₁₆, ½, ⅝, while the nut has an axial displacement of 0.30 mm.
Figure 20:
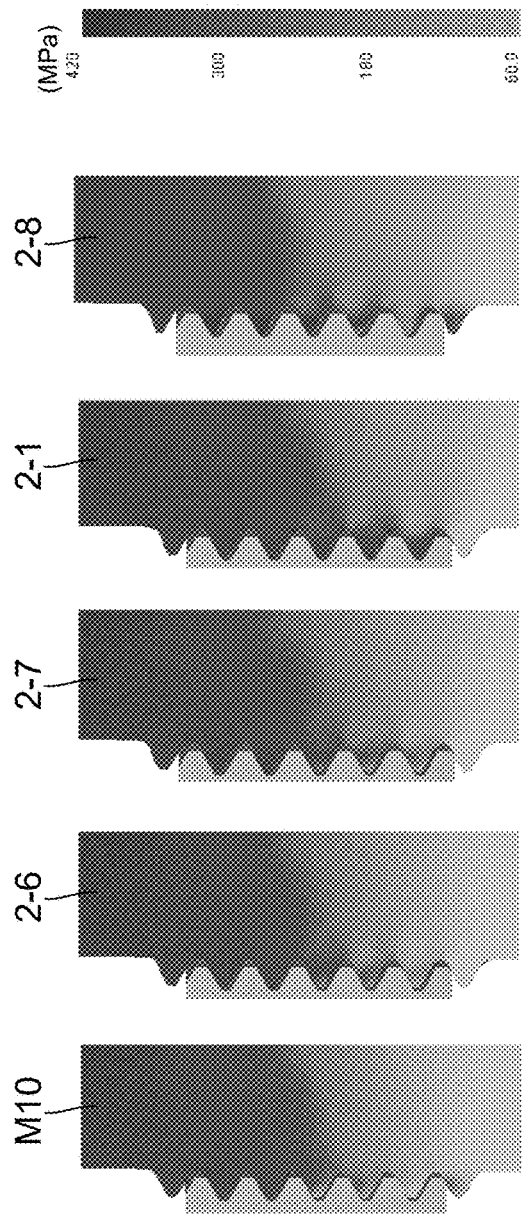
FIG. 20 illustrates a comparison among the stress simulations of the standard bolt and a group of bolts, according to the embodiment of FIG. 7 under the conditions $\theta 1=80.5°$ and H4/H3=⅜, ⁷⁄₁₆, ½, ⅝, while the nut has an axial displacement of 0.30 mm.

Referring to FIG. 17, FIG. 18, FIG. 19 and FIG. 20, where FIG. 17 illustrates a comparison among the strain simulations of the standard bolt and a group of bolts, according to the embodiment of FIG. 7 under the conditions θ1=80.5° and H4/H3=⅜, ⁷⁄₁₆, ½, ⅝, while the nut has an axial displacement of 0.15 mm; FIG. 18 illustrates a comparison among the stress simulations of the standard bolt and a group of bolts, according to the embodiment of FIG. 7 under the conditions θ1=80.5° and H4/H3=⅜, ⁷⁄₁₆, ½, ⅝, while the nut has an axial displacement of 0.15 mm; FIG. 19 illustrates a comparison among the strain simulations of the standard bolt and a group of bolts, according to the embodiment of FIG. 7 under the conditions θ1=80.5° and H4/H3=⅜, ⁷⁄₁₆, ½, ⅝, while the nut has an axial displacement of 0.30 mm; and FIG. 20 illustrates a comparison among the stress simulations of the standard bolt and a group of bolts, according to the embodiment of FIG. 7 under the conditions θ1=80.5° and H4/H3=⅜, ⁷⁄₁₆, ½, ⅝, while the nut has an axial displacement of 0.30 mm. Note that the bolts of the disclosure used in FIGS. 17 to 20 are bolts produced according to the above configurations of the bolt 2 shown in FIG. 7 under the conditions θ1=80.5° and H4/H3=⅜, ⁷⁄₁₆, ½, ⅝, and therefore these bolts can be denoted as 2-6, 2-7, 2-1 and 2-8.

In each of FIGS. 17-20, the figures from the left to the right are the standard bolt M10, a bolt 2-6 with θ1=80.5° and H4/H3=⅜, a bolt 2-7 with "θ1=80.5° and H4/H3=⁷⁄₁₆, a bolt 2-1 with θ1=80.5° and H4/H3=½, and a bolt 2-8 with θ1=80.5° and H4/H3=⅝. The nut used in the above simulations was produced according to the standards of M10JIS and has a thread pitch of 1.5 mm, and the nut is able to be engaged with five threads at the same time.

FIG. 17 and FIG. 18 show that the nut has moved downward an axial displacement of 0.15 mm. As shown in FIG. 17, the nut causes strain on, for example, the first and second threads of the standard bolt M10; the nut causes strain on, for example, the first to fifth threads of each of the bolt 2-6, bolt 2-7, bolt 2-1 and bolt 2-8. As shown in FIG. 18, the standard bolt M10 distributes the stress to, for example, the first to third threads, and the bolt 2-6, bolt 2-7, bolt 2-1 and bolt 2-8 each distribute the stress to, for example, their first to fifth threads.

FIG. 19 and FIG. 20 show that the nut has moved downward an axial displacement of 0.30 mm. As shown in FIG. 19, the nut causes strain on, for example, the first and second threads of the standard bolt M10; and the nut causes strain on, for example, the first to fifth threads of each of the bolt 2-6, bolt 2-7, bolt 2-1 and bolt 2-8. As shown in FIG. 20, the standard bolt M10 distributes the stress to, for example, the first to third threads, and the bolt 2-6, bolt 2-7, bolt 2-1 and bolt 2-8 each distribute the stress to, for example, their first to fifth threads.

Accordingly, comparing to the standard bolt M10, the bolt 2-6, bolt 2-7, bolt 2-1, that satisfy the conditions of θ1=80.5° and H4/H3=⅜-½, each have more threads subjected to strain so as to be able to have more threads to store elastic potential energy against the nut and thus increasing the frictional force. Therefore, the bolt 2-6, bolt 2-7, bolt 2-1, that satisfy the above conditions, are more capable of preventing self-loosening due to vibration. Further, since the stress distribution on the threads of the bolt 2-6, bolt 2-7 and bolt 2-1 is much more even, the threads of the bolt 2-6, bolt 2-7 and bolt 2-1 are more likely to prevent breakage due to vibration or sudden shock.

Also, comparing to the results of the axial displacement of 0.15 mm and the axial displacement of 0.30 mm, the strain and the stress distribution on the thread portion of each of the bolt 2-6, bolt 2-7 and bolt 2-1 do not have a significant change. Therefore, if the vibration causes the nut to be axially displaced, the strain and the stress distribution on the thread portion of each of the bolt 2-6, bolt 2-7 and bolt 2-1 will not have a significant change, such that the frictional force between the bolt 2-6, bolt 2-7 and bolt 2-1 and the nut will not have a significant change, either. This proves that the bolt 2-6, bolt 2-7 and bolt 2-1 are more likely to prevent self-loosening due to vibration.

However, it is noted that the parameter of H4/H3=⅝ of the bolt 2-8 exceeds the range of H4/H3 discussed above. As can be seen from FIG. 17 and FIG. 19, the nut causes strain on, for example, the first to fifth threads of the bolt 2-8, but less part of the main body of the bolt 2-8 is subjected to the strain compared to that of the bolt 2-6, bolt 2-7 and bolt 2-1. As can be seen from FIG. 18 and FIG. 20, the bolt 2-8 distributes the stress to the threads, but the stress distributed to the main body of the bolt 2-8 is fewer than that distributed to the main bodies of the bolt 2-6, bolt 2-7 and bolt 2-1. This shows that the strain and the stress distribution on the bolt 2-8 caused by the axial displacement of the nut have less amount to be distribute to the main body of the bolt 2-8 compared to the bolt 2-6, bolt 2-7 and bolt 2-1. Therefore, in the case that H4/H3 exceeds the range of ⅜ to ½, such bolt (e.g., the bolt 2-8) may have a decreased capability in preventing self-loosening and breakage compared to those with H4/H3 falling within the range of ⅜ to ½.

Figure 21:
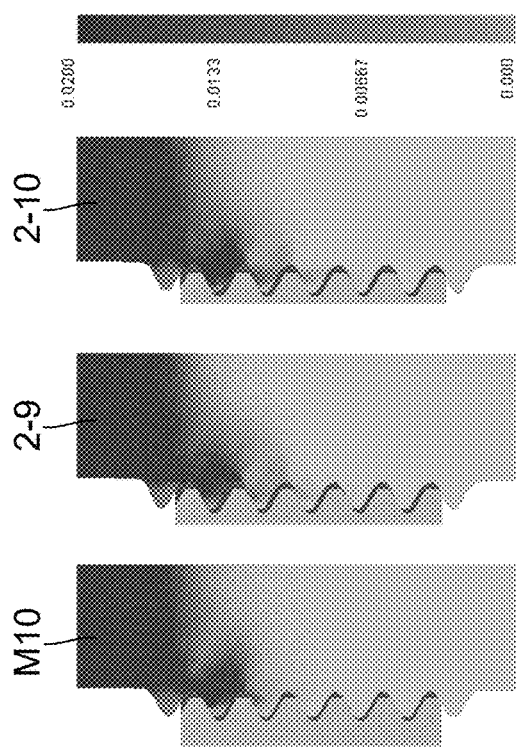
FIG. 21 illustrates a comparison among the strain simulations of the standard bolt and a group of bolts, according to the embodiment of FIG. 7 under the conditions $\theta 1=77.5°$, 82.5° and H4/H3=⁷⁄₁₆, while the nut has an axial displacement of 0.15 mm.
Figure 22:
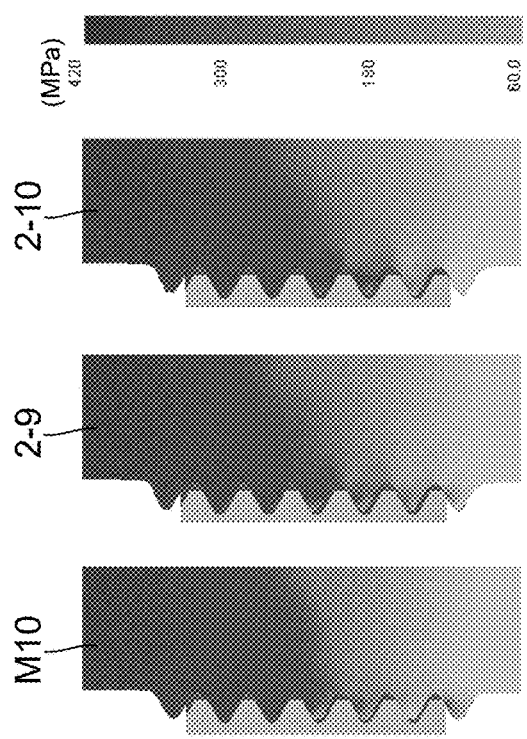
FIG. 22 illustrates a comparison among the stress simulations of the standard bolt and a group of bolts, according to the embodiment of FIG. 7 under the conditions $\theta 1=77.5°$, 82.5° and H4/H3=⁷⁄₁₆, while the nut has an axial displacement of 0.15 mm.
Figure 23:
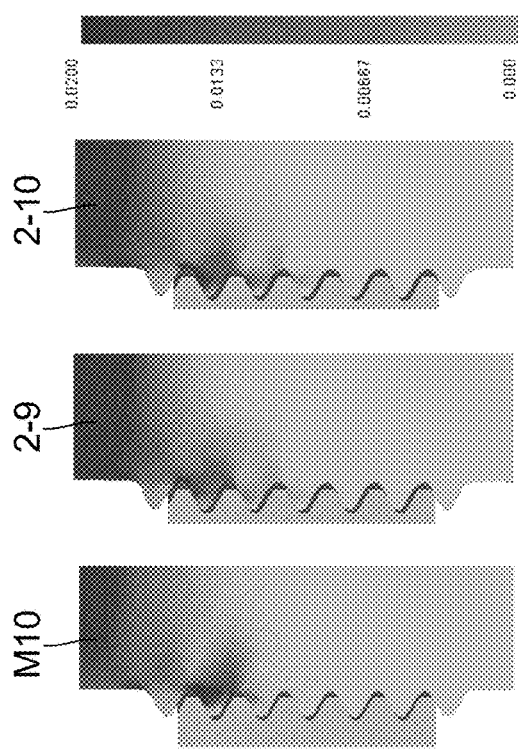
FIG. 23 illustrates a comparison among the strain simulations of the standard bolt and a group of bolts, according to the embodiment of FIG. 7 under the conditions $\theta 1=77.5°$, 82.5° and H4/H3=⁷⁄₁₆, while the nut has an axial displacement of 0.30 mm.
Figure 24:
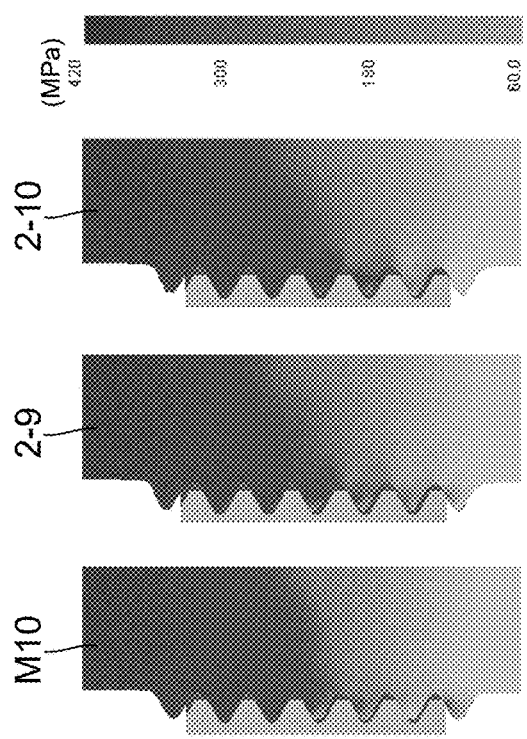
FIG. 24 illustrates a comparison among the stress simulations of the standard bolt and a group of bolts, according to the embodiment of FIG. 7 under the conditions $\theta 1=77.5°$, 82.5° and H4/H3=⁷⁄₁₆, while the nut has an axial displacement of 0.30 mm.

Referring to FIG. 21, FIG. 22, FIG. 23 and FIG. 24, where FIG. 21 illustrates a comparison among the strain simulations of the standard bolt and a group of bolts, according to the embodiment of FIG. 7 under the conditions θ1=77.5°, 82.5° and H4/H3=⁷⁄₁₆, while the nut has an axial displacement of 0.15 mm; FIG. 22 illustrates a comparison among the stress simulations of the standard bolt and a group of bolts, according to the embodiment of FIG. 7 under the conditions θ1=77.5°, 82.5° and H4/H3=7/16, while the nut has an axial displacement of 0.15 mm; FIG. 23 illustrates a comparison among the strain simulations of the standard bolt and a group of bolts, according to the embodiment of FIG. 7 under the conditions θ1=77.5°, 82.5° and H4/H3=7/16, while the nut has an axial displacement of 0.30 mm; and FIG. 24 illustrates a comparison among the stress simulations of the standard bolt and a group of bolts, according to the embodiment of FIG. 7 under the conditions θ1=77.5°, 82.5° and H4/H3=7/16, while the nut has an axial displacement of 0.30 mm. Note that the bolts of the disclosure used in FIGS. 21 to 21 are bolts produced according to the above configurations of the bolt 2 shown in FIG. 7 under the conditions θ1=77.5°, 82.5° and H4/H3=7/16, and therefore these bolts can be denoted as 2-9 and 2-10.

In each of FIGS. 21-24, the figures from the left to the right are the standard bolt M10, a bolt 2-9 with θ1=77.5° and H4/H3=7/16, and a bolt 2-10 with θ1=82.5° and H4/H3=7/16. The nut used in the above simulations was produced according to the standards of M10JIS and has a thread pitch of 1.5 mm, and the nut is able to be engaged with five threads at the same time.

FIG. 21 and FIG. 22 show that the nut has moved downward an axial displacement of 0.15 mm. As shown in FIG. 21, the nut causes strain on, for example, the first and second threads of the standard bolt M10; the nut causes strain on, for example, the first to third threads of the bolt 2-9 and bolt 2-10. As shown in FIG. 22, the standard bolt M10 distributes the stress to, for example, the first to third threads, and the bolt 2-9 and bolt 2-10 can distribute the stress to, for example, their first to fifth threads.

FIG. 23 and FIG. 24 show that the nut has moved downward an axial displacement of 0.30 mm. As shown in FIG. 23, the nut causes strain on, for example, the first and second threads of the standard bolt M10, and the nut causes strain on, for example, the first to third threads of the bolt 2-9 and bolt 2-10. As shown in FIG. 24, the standard bolt M10 distributes the stress to, for example, the first to third threads, and the bolt 2-9 and bolt 2-10 can distribute the stress to, for example, their first to fifth threads.

Accordingly, comparing to the standard bolt M10, the bolt 2-9 and bolt 2-10, that satisfy the conditions of θ1=75°-90° and H4/H3=7/16, each have more threads subjected to strain so as to be able to have more threads to store elastic potential energy against the nut and thus increasing the frictional force. Therefore, the bolt 2-9 and bolt 2-10, that satisfy the conditions of θ1=75°-90° and H4/H3=7/16, are more capable of preventing self-loosening due to vibration. Further, since the stress distribution on the threads of the bolt 2-9 and bolt 2-10 is much more even, the threads of the bolt 2-9 and bolt 2-10 are more likely to prevent breakage due to vibration or sudden shock.

Also, comparing to the results of the axial displacement of 0.15 mm and the axial displacement of 0.30 mm, the strain and the stress distribution on the thread portion of each of the bolt 2-9 and bolt 2-10, that satisfy the above conditions, do not have a significant change. Therefore, if the vibration causes the nut to be axially displaced, the strain and the stress distribution on the thread portion of each of the bolt 2-9 and bolt 2-10 will not have a significant change, such that the frictional force between the bolt 2-9 and bolt 2-10 and the nut will not have a significant change, either. This proves that the bolt 2-9 and bolt 2-10 are more likely to prevent self-loosening due to vibration.

Figure 25:
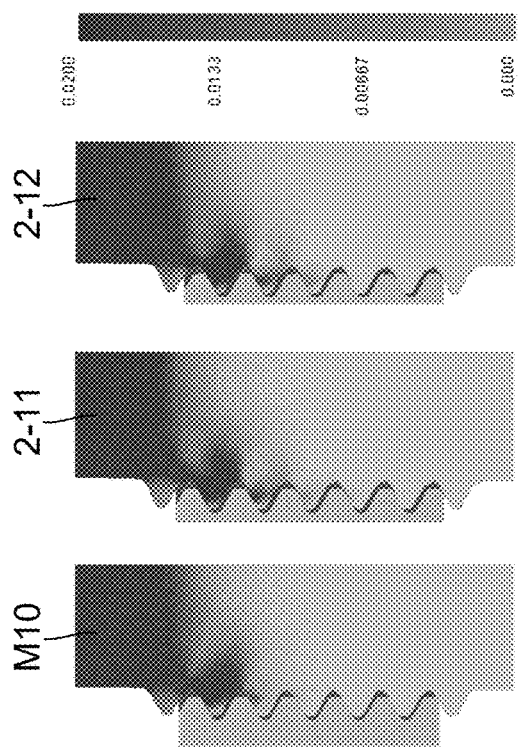
FIG. 25 illustrates a comparison among the strain simulations of the standard bolt and a group of bolts, according to the embodiment of FIG. 7 under the conditions $\theta 1=77.5°$, 82.5° and H4/H3=⅜, while the nut has an axial displacement of 0.15 mm.
Figure 26:
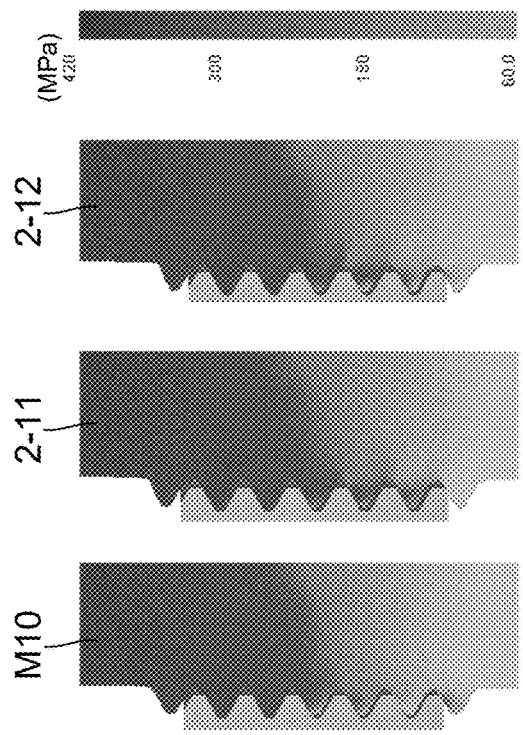
FIG. 26 illustrates a comparison among the stress simulations of the standard bolt and a group of bolts, according to the embodiment of FIG. 7 under the conditions $\theta 1=77.5°$, 82.5° and H4/H3=⅜, while the nut has an axial displacement of 0.15 mm.
Figure 27:
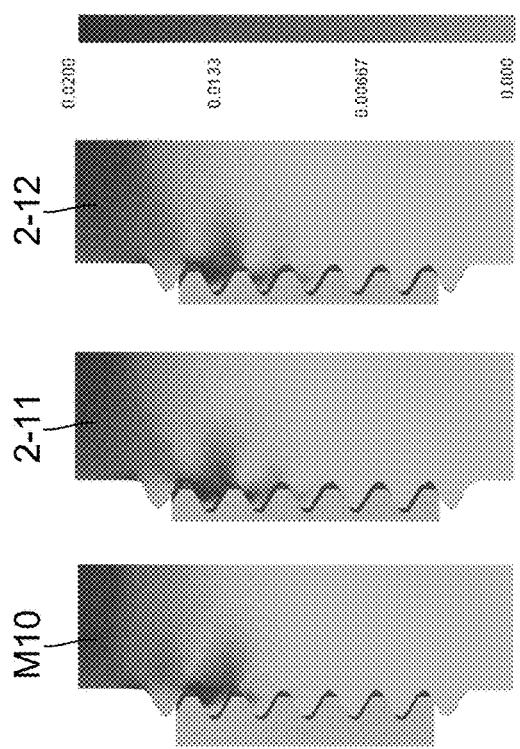
FIG. 27 illustrates a comparison among the strain simulations of the standard bolt and a group of bolts, according to the embodiment of FIG. 7 under the conditions $\theta 1=77.5°$, 82.5° and H4/H3=⅜, while the nut has an axial displacement of 0.30 mm.
Figure 28:
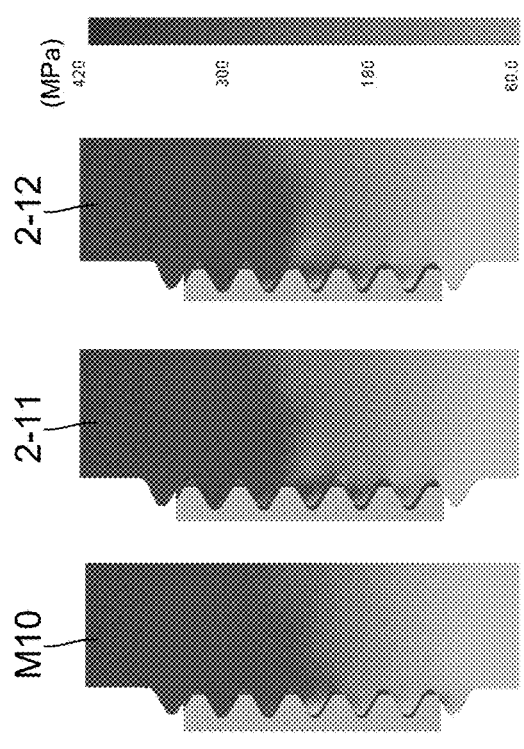
FIG. 28 illustrates a comparison among the stress simulations of the standard bolt and a group of bolts, according to the embodiment of FIG. 7 under the conditions $\theta 1=77.5°$, 82.5° and H4/H3=⅜, while the nut has an axial displacement of 0.30 mm.

Referring to FIG. 25, FIG. 26, FIG. 27 and FIG. 28, where FIG. 25 illustrates a comparison among the strain simulations of the standard bolt and a group of bolts, according to the embodiment of FIG. 7 under the conditions θ1=77.5°, 82.5° and H4/H3=3/8, while the nut has an axial displacement of 0.15 mm; FIG. 26 illustrates a comparison among the stress simulations of the standard bolt and a group of bolts, according to the embodiment of FIG. 7 under the conditions θ1=77.5°, 82.5° and H4/H3=3/8, while the nut has an axial displacement of 0.15 mm; FIG. 27 illustrates a comparison among the strain simulations of the standard bolt and a group of bolts, according to the embodiment of FIG. 7 under the conditions θ1=77.5°, 82.5° and H4/H3=3/8, while the nut has an axial displacement of 0.30 mm; FIG. 28 illustrates a comparison among the stress simulations of the standard bolt and a group of bolts, according to the embodiment of FIG. 7 under the conditions θ1=77.5°, 82.5° and H4/H3=3/8, while the nut has an axial displacement of 0.30 mm. Note that the bolts of the disclosure used in FIGS. 25-28 are bolts produced according to the above configurations of the bolt 2 shown in FIG. 7 under the conditions θ1=77.5°, 82.5° and H4/H3=3/8, and therefore these bolts can be denoted as 2-11 and 2-12.

In each of FIGS. 25-28, the figures from the left to the right are the standard bolt M10, a bolt 2-11 with θ1=77.5° and H4/H3=3/8, and a bolt 2-12 with θ1=82.5° and H4/H3=3/8. The nut used in the above simulations was produced according to the standards of M10JIS and has a thread pitch of 1.5 mm, and the nut is able to be engaged with five threads at the same time.

FIG. 25 and FIG. 26 show that the nut has moved downward an axial displacement of 0.15 mm. As shown in FIG. 25, the nut causes strain on, for example, the first and second threads of the standard bolt M10; the nut causes strain on, for example, the first to third threads of the bolt 2-11 and bolt 2-12. As shown in FIG. 26, the standard bolt M10 distributes the stress to, for example, the first to third threads, and the bolt 2-11 and bolt 2-12 each distribute the stress to, for example, their first to fifth threads.

FIG. 27 and FIG. 28 show that the nut has moved downward an axial displacement of 0.30 mm. As shown in FIG. 27, the nut causes strain on, for example, the first and second threads of the standard bolt M10; and the nut causes strain on, for example, the first to third threads of each of the bolt 2-11 and bolt 2-12. As shown in FIG. 28, the standard bolt M10 distributes the stress to, for example, the first to third threads; and the bolt 2-11 and bolt 2-12 each distribute the stress to, for example, their first to fifth threads.

Accordingly, comparing to the standard bolt M10, the bolt 2-11 and bolt 2-12, that satisfy the conditions of θ1=75°-90° and H4/H3=3/8, each have more threads subjected to strain so as to be able to have more threads to store elastic potential energy against the nut and thus increasing the frictional force. Therefore, the bolt 2-11 and bolt 2-12, that satisfy the conditions of θ1=75°-90° and H4/H3=3/8, are more capable of preventing self-loosening due to vibration. Further, since the stress distribution on the threads of the bolt 2-11 and bolt 2-12 is much more even, the threads of the bolt 2-11 and bolt 2-12 are more likely to prevent breakage due to vibration or sudden shock.

Also, comparing to the results of the axial displacement of 0.15 mm and the axial displacement of 0.30 mm, the strain and the stress distribution on the thread portion of each of the bolt 2-11 and bolt 2-12 do not have a significant change. Therefore, if the vibration causes the nut to be axially displaced, the strain and the stress distribution on the thread portion of each of the bolt 2-11 and bolt 2-12 will not have a significant change, such that the frictional force between the bolt 2-11 and bolt 2-12 and the nut will not have a significant change, either. This proves that the bolt 2-11 and bolt 2-12 are more likely to prevent self-loosening due to vibration.

Figure 29:
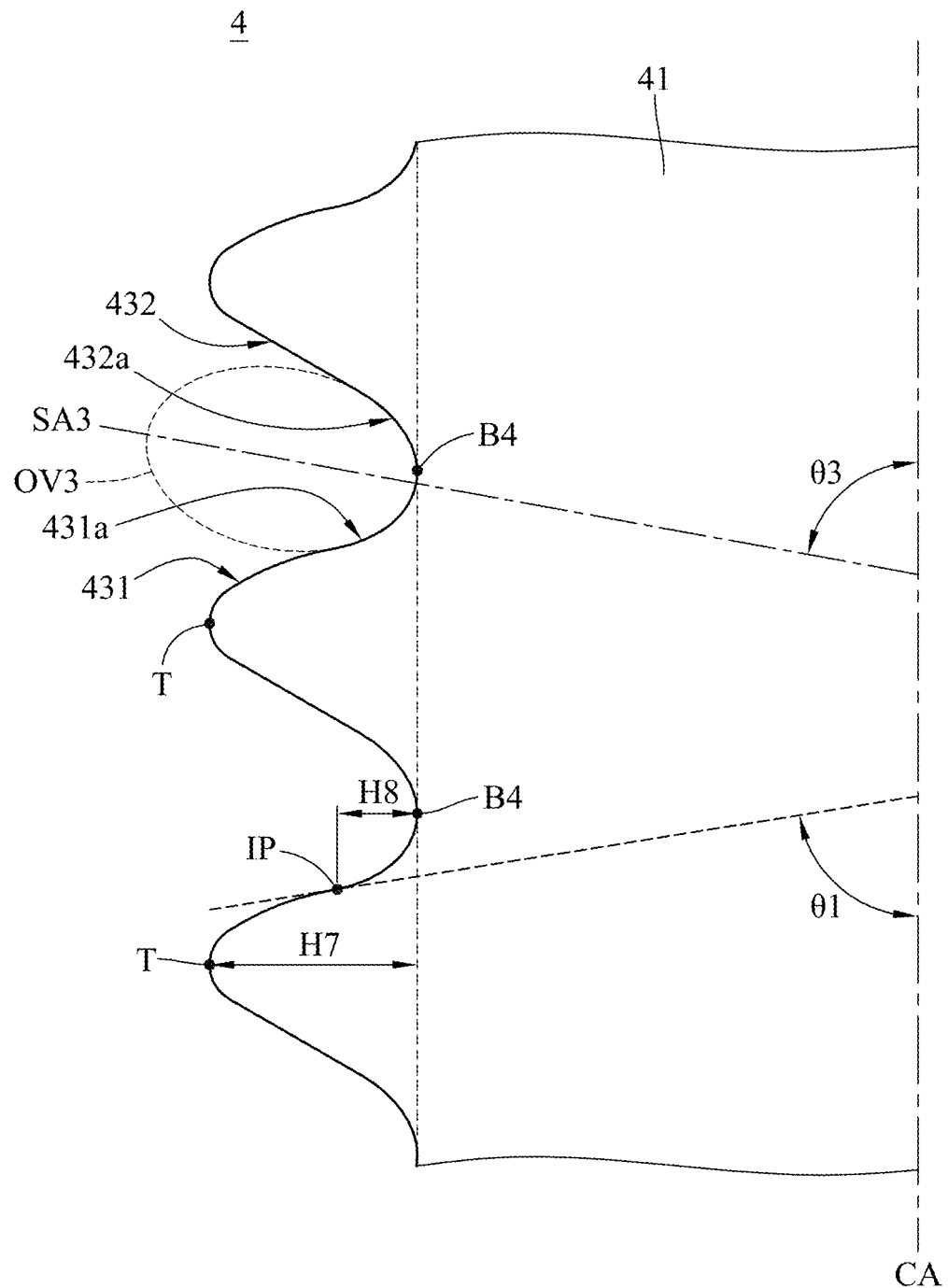
FIG. 29 is a partial enlarged cross-sectional side view of a bolt according to still another embodiment of the disclosure.

Referring to FIG. 29, a partial enlarged cross-sectional side view of a bolt 4 according to still another embodiment of the disclosure is provided.

In this embodiment, in the bolt 4, a tangent line to the inflection point IP of a bearing surface 431 is at an angle θ1 ranging between 75° and 90° to the central axis CA, in some embodiments, the angle θ1 is preferably ranging between 77.5° and 82.5°. In addition, in the bolt 4, the straight distance from the crest T to a root B4 along the radial direction of a main body 41 is denoted as H7, where H7 can also be called a crest height, and the straight distance from the inflection point IP to the main body 41 is denoted as a H8, where the straight distance H8 is ⅜-½ of the crest height H7.

In this embodiment, in the bolt 4, a connecting surface 432a of a non-bearing surface 432 and a concave curved surface 431a of a bearing surface 431 fit part of the same geometrical curve OV3. The geometrical curve OV3 has a line of symmetry SA3. The line of symmetry SA3 does not pass through the root B4, and the line of symmetry SA3 is at an acute angle θ3 to the central axis CA. In this embodiment, the geometrical curve OV3 forms an oval, but the disclosure is not limited thereto. In some other embodiments, the geometrical curve OV3 may be any other suitable geometrical curves, such as part of one of the curved lines of a hyperbolic or part of a parabolic. In some other embodiments, the non-bearing surface 432 of the connecting surface 432a and the concave curved surface 431a of the bearing surface 431 may fit the same geometrical curves.

Figure 30:
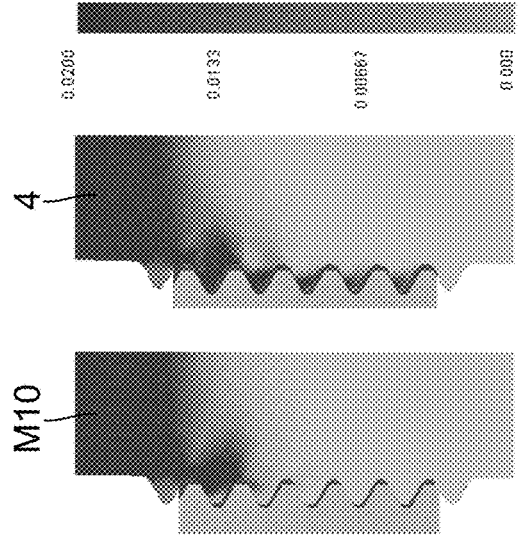
FIG. 30 illustrates a comparison among the strain simulations of the standard bolt and the bolt shown in FIG. 29 while the nut has an axial displacement of 0.15 mm.
Figure 31:
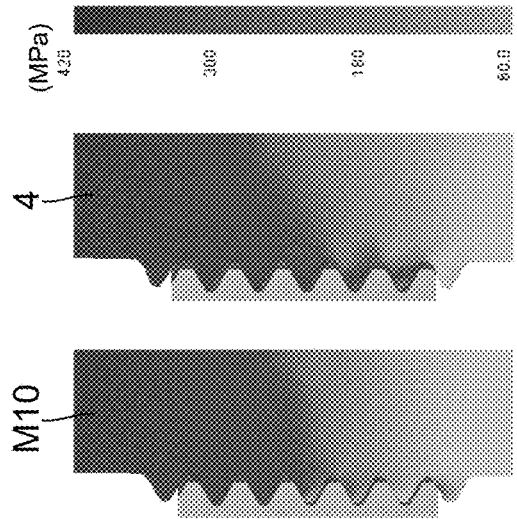
FIG. 31 illustrates a comparison among the stress simulations of the standard bolt and the bolt shown in FIG. 29 while the nut has an axial displacement of 0.15 mm.
Figure 32:
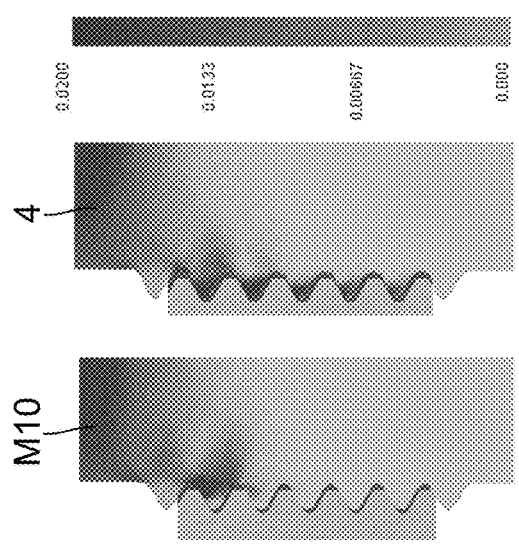
FIG. 32 illustrates a comparison among the strain simulations of the standard bolt and the bolt shown in FIG. 29 while the nut has an axial displacement of 0.30 mm.
Figure 33:
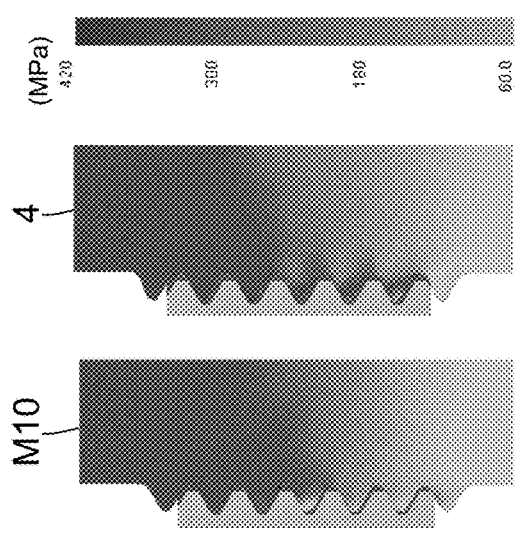
FIG. 33 illustrates a comparison among the stress simulations of the standard bolt and the bolt shown in FIG. 29 while the nut has an axial displacement of 0.30 mm.

Referring to FIG. 30, FIG. 31, FIG. 32 and FIG. 33, where FIG. 30 illustrates a comparison among the strain simulations of the standard bolt and the bolt 4 shown in FIG. 29 while the nut has an axial displacement of 0.15 mm; FIG. 31 illustrates a comparison among the stress simulations of the standard bolt and the bolt 4 shown in FIG. 29 while the nut has an axial displacement of 0.15 mm; FIG. 32 illustrates a comparison among the strain simulations of the standard bolt and the bolt 4 shown in FIG. 29 while the nut has an axial displacement of 0.30 mm; and FIG. 33 illustrates a comparison among the stress simulations of the standard bolt and the bolt 4 shown in FIG. 29 while the nut has an axial displacement of 0.30 mm.

In each of FIGS. 30-33, the figures from the standard bolt M10 and the bolt 4. The nut used in the above simulations was produced according to the standards of M10JIS and has a thread pitch of 1.5 mm, and the nut is able to be engaged with five threads at the same time. Note that the bolt 4 used herein has, for example, H8/H7 of 0.392 and θ1 of 80.5°.

FIG. 30 and FIG. 31 show that the nut has moved downward an axial displacement of 0.15 mm. As shown in FIG. 30, the nut causes strain on, for example, the first and second threads of the standard bolt M10, and the nut causes strain on, for example, the first to fifth threads of the bolt 4. As shown in FIG. 31, the standard bolt M10 distributes the stress to, for example, the first to third threads, and the bolt 4 distributes the stress to, for example, the first to fifth threads.

FIG. 32 and FIG. 33 show that the nut has moved downward an axial displacement of 0.30 mm. As shown in FIG. 32, the nut causes strain on, for example, the first and second threads of the standard bolt M10, and the nut causes strain on, for example, the first to fifth threads of the bolt 4. As shown in FIG. 33, the standard bolt M10 distributes the stress to, for example, the first to fourth threads, and the bolt 4 distributes the stress to, for example, the first to fifth threads.

Accordingly, comparing to the standard bolt M10, the bolt 4 has more threads subjected to strain so as to be able to have more threads to store elastic potential energy against the nut and thus increasing the frictional force. Therefore, the bolt 4 is more capable of preventing self-loosening due to vibration. Further, since the stress distribution on the threads of the bolt 4 is much more even, the thread of the bolt 4 is more likely to prevent breakage due to vibration or sudden shock.

Also, comparing to the results of the axial displacement of 0.15 mm and the axial displacement of 0.30 mm, the strain and the stress distribution on the thread portion of the bolt 4 do not have a significant change. Therefore, if the vibration causes the nut to be axially displaced, the strain and the stress distribution on the thread portion of the bolt 4 will not have a significant change, such that the frictional force between the bolt 4 and the nut will not have a significant change, either. This proves that the bolt 4 is more likely to prevent self-loosening due to vibration.

As discussed above, at least one of the embodiments of the disclosure provides a bolt whose thread portion has a bearing surface which is a continuous curved surface or has an inflection point, where the bearing surface at least includes a convex curved surface and a concave curved surface connected to each other, the convex curved surface is located further away from the main body than the concave curved surface, and the concave curved surface connects the main body. In such a configuration, the thread portion is able to have a larger range of elastic deformation during preload, and the elastically deformed thread portion can store a larger amount of elastic potential energy against the fastener engaged with such bolt and thus increasing the frictional force. As a result, the bolt of the disclosure has a greater capability in preventing self-loosening due to vibration. In addition, the bearing surface of such bolt is also able to evenly distribute the stress while an axial load is applied on the thread portion, therefore the bolt of the disclosure has a greater capability in preventing the thread from breaking due to vibration or sudden impact.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bolt, comprising:
    a main body, having a central axis;
    a head portion, connected to the main body; and
    a thread portion, connected to the main body and running around the central axis, wherein the thread portion has a bearing surface facing toward the head portion, the bearing surface is a continuous curved surface, the bearing surface comprises a concave curved surface, a convex curved surface and a flank surface, the concave curved surface connects the main body, the convex curved surface is located further away from the main body than the concave curved surface, one side of the convex curved surface connects the concave curved surface, another side of the convex curved surface connects the flank surface, and a tangent line to a joint between the convex curved surface and the concave curved surface is at an angle ranging between 75° and 90° to the central axis wherein a furthest distance from a peak of the thread portion to the main body is a crest height, and a straight distance from the joint between the convex curved surface and the concave curved surface to the main body is 3/8- 1/2 of the crest height.

2. The bolt as claimed in claim 1, wherein the tangent line to the joint between the convex curved surface and the concave curved surface is at the angle ranging between 77.5° and 82.5° to the central axis.

3. The bolt as claimed in claim 1, wherein the thread portion further comprises a non-bearing surface, the non-bearing surface faces away from the head portion, the non-bearing surface comprises a connecting surface and a non-bearing flank surface, a side of the connecting surface connects the main body, another side of the connecting surface connects the non-bearing flank surface, the concave curved surface fits at least part of a first geometrical curve, the connecting surface fits at least part of a second geometrical curve, the first geometrical curve is different from the second geometrical curve, and a length of an orthogonal projection of the bearing surface onto the central axis is equal to or smaller than a length of an orthogonal projection of the non-bearing surface onto the central axis.

4. The bolt as claimed in claim 3, wherein the first geometrical curve has a first line of symmetry, the second geometrical curve has a second line of symmetry, the first line of symmetry and the second line of symmetry are perpendicular to the central axis, and the first line of symmetry overlaps the second line of symmetry.

5. The bolt as claimed in claim 1, wherein the thread portion further has a non-bearing surface, the non-bearing surface faces away from the head portion, the non-bearing surface comprises a connecting surface and a non-bearing flank surface, a side of the connecting surface connects the main body, another side of the connecting surface connects the non-bearing flank surface, both of the connecting surface and the concave curved surface fit at least part of a same geometrical curve, and a length of an orthogonal projection of the bearing surface onto the central axis is equal to or smaller than a length of an orthogonal projection of the non-bearing surface onto the central axis.

6. A bolt, comprising:
a main body, having a central axis;
a head portion, connected to the main body; and
a thread portion, connected to the main body and running around the central axis, wherein the thread portion has a bearing surface facing toward the head portion, the bearing surface has an inflection point, the bearing surface comprises a concave curved surface, a convex curved surface and a flank surface, the concave curved surface connects the main body, the convex curved surface is located further away from the main body than the concave curved surface, one side of the convex curved surface is connected to the concave curved surface via the inflection point, another side of the convex curved surface connects the flank surface, and a tangent line to the inflection point is at an angle ranging between 75° and 90° to the central axis wherein a furthest distance from a peak of the thread portion to the main body is a crest height, and a straight distance from the joint between the convex curved surface and the concave curved surface to the main body is 3/8-1/2 of the crest height.

7. The bolt as claimed in claim 6, wherein the tangent line to the inflection point is at the angle ranging between 77.5° and 82.5° to the central axis.

8. The bolt as claimed in claim 6, wherein the thread portion further has a non-bearing surface, the non-bearing surface faces away from the head portion, the non-bearing surface comprises a connecting surface and a non-bearing flank surface, a side of the connecting surface connects the main body, another side of the connecting surface connects the non-bearing flank surface, the concave curved surface fits at least part of a first geometrical curve, the connecting surface fits at least part of a second geometrical curve, the first geometrical curve is different from the second geometrical curve, and a length of an orthogonal projection of the bearing surface onto the central axis is equal to or smaller than a length of an orthogonal projection of the non-bearing surface onto the central axis.

9. The bolt as claimed in claim 6, wherein the first geometrical curve has a first line of symmetry, the second geometrical curve has a second line of symmetry, the first line of symmetry and the second line of symmetry are perpendicular to the central axis, and the first line of symmetry overlaps the second line of symmetry.

10. The bolt as claimed in claim 6, wherein the thread portion further has a non-bearing surface, the non-bearing surface faces away from the head portion, the non-bearing surface comprises a connecting surface and a non-bearing flank surface, a side of the connecting surface connects the main body, another side of the connecting surface connects the non-bearing flank surface, both of the connecting surface and the concave curved surface fit at least part of a same geometrical curve, and a length of an orthogonal projection of the bearing surface onto the central axis is equal to or smaller than a length of an orthogonal projection of the non-bearing surface onto the central axis.

* * * * *